United States Patent
Link, II

(10) Patent No.: US 11,039,335 B2
(45) Date of Patent: Jun. 15, 2021

(54) METHOD AND SYSTEM FOR MANAGING THE PROVIDING OF DIFFERENT CLASSES OF WIRELESS COMMUNICATIONS SERVICES FROM DIFFERENT MOBILE NETWORKS

(71) Applicant: M2MD Technologies, Inc., Atlanta, GA (US)

(72) Inventor: Charles M. Link, II, Atlanta, GA (US)

(73) Assignee: M2MD TECHNOLOGIES, INC., Atlanta, GA (US)

( * ) Notice: Subject to any disclaimer, the term of this patent is extended or adjusted under 35 U.S.C. 154(b) by 182 days.

(21) Appl. No.: 16/170,315

(22) Filed: Oct. 25, 2018

(65) Prior Publication Data

US 2019/0098530 A1    Mar. 28, 2019

Related U.S. Application Data

(63) Continuation of application No. 15/593,756, filed on May 12, 2017, now Pat. No. 10,142,881.

(60) Provisional application No. 62/335,393, filed on May 12, 2016.

(51) Int. Cl.
*H04W 28/02* (2009.01)
*H04W 76/11* (2018.01)
*H04L 12/851* (2013.01)

(52) U.S. Cl.
CPC ..... *H04W 28/0268* (2013.01); *H04L 47/2441* (2013.01); *H04W 76/11* (2018.02)

(58) Field of Classification Search
CPC ............. H04W 28/0268; H04W 76/11; H04L 47/2441
See application file for complete search history.

(56) References Cited

U.S. PATENT DOCUMENTS

| | | | |
|---|---|---|---|
| 2014/0286159 A1* | 9/2014 | Etemad | H04B 7/0452 370/230 |
| 2015/0078246 A1* | 3/2015 | Lohtia | H04W 4/06 370/312 |
| 2015/0358857 A1* | 12/2015 | Duan | H04W 48/16 370/237 |
| 2016/0269985 A1* | 9/2016 | Bergstrom | H04W 76/10 |
| 2019/0373414 A1* | 12/2019 | Kaufman | G08G 1/0112 |

* cited by examiner

*Primary Examiner* — Chi H Pham
*Assistant Examiner* — Weibin Huang
(74) *Attorney, Agent, or Firm* — Doughty Law, L.L.C.; John L. Doughty

(57) ABSTRACT

A platform in a wireless public land mobile network environment associates a mobile device's unique identifier with a provider of services to the mobile device as well as with the device's anchor network. When the mobile device wirelessly accesses services from a local wireless network while roaming outside of its anchor network's wireless coverage via an APN of the local network, the platform receives electronic data session transaction information records from the local network and replaces the mobile device's unique identifier with a pseudo/replacement unique device identifier that is associated in the platform with the local network and returns the transaction record to the local network instead of to the anchor network.

14 Claims, 6 Drawing Sheets

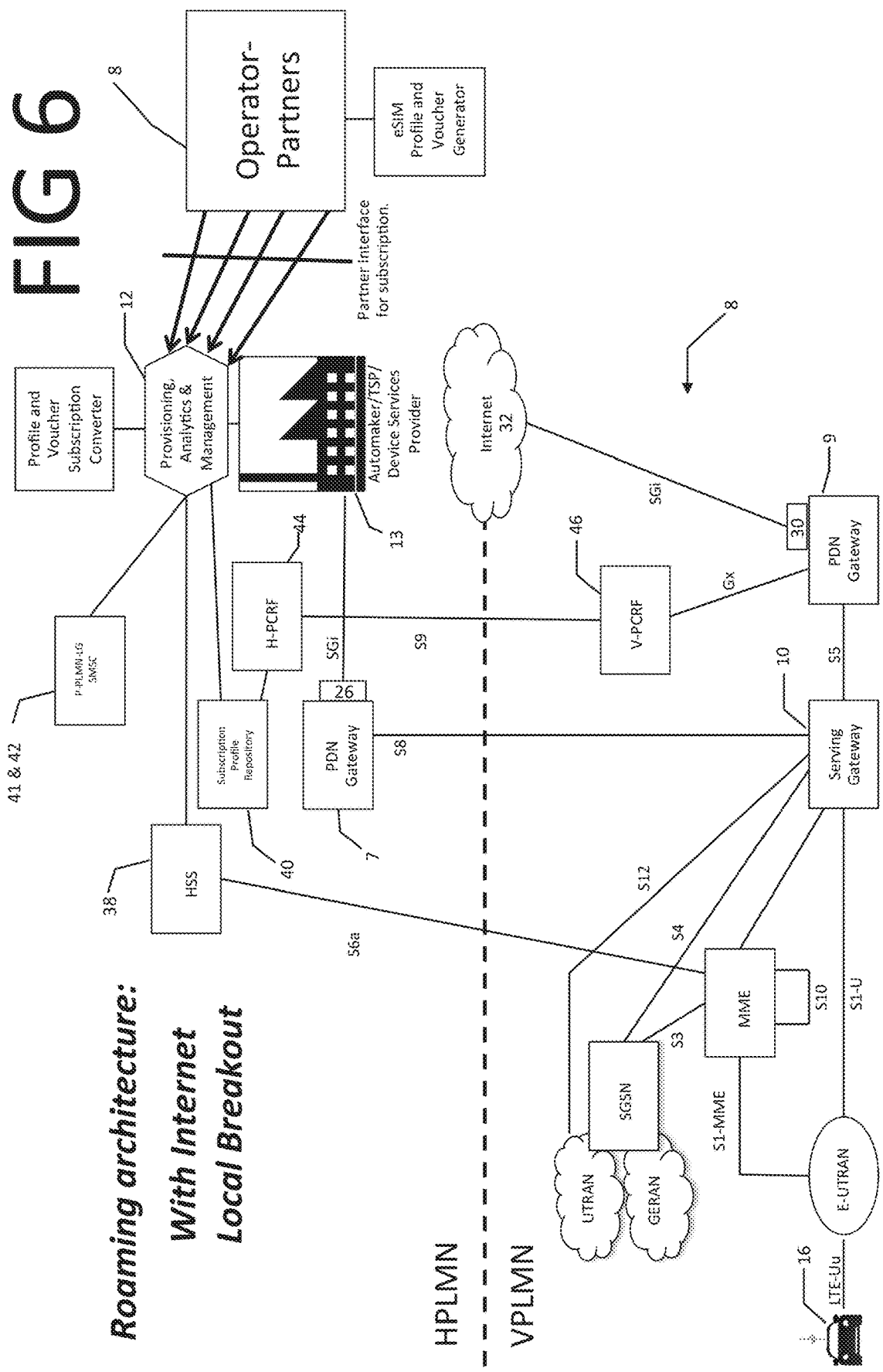

METHOD AND SYSTEM FOR MANAGING THE PROVIDING OF DIFFERENT CLASSES OF WIRELESS COMMUNICATIONS SERVICES FROM DIFFERENT MOBILE NETWORKS

CROSS REFERENCE TO RELATED APPLICATION

This application is a continuation of, and claims priority under 35 U.S.C. 120 to, U.S. patent application Ser. No. 15/593,756 entitled "Method and system for managing for managing the providing of different classes of wireless communications service from different mobile networks," which was filed May 12, 2017. This application also claims priority under 35 U.S.C. 119(e) to U.S. provisional patent application No. 62/335,393 entitled "Method and system for providing high volume high bandwidth [sic] communications wireless communications services across many mobile network operators," which was filed May 12, 2016, and which is incorporated herein by reference in its entirety.

FIELD

The field relates, generally, to telematics devices and systems, and other wireless machine devices and systems, and to methods for delivering high volume, high bandwidth wireless data traffic flows from multiple mobile network operators to a device having a unique identifier associated with a single anchor operator that does not provide the high volume, high bandwidth wireless data traffic flows.

Introduction and Principles

The term 'telematics' may refer to the integrated use of telecommunications devices and systems and information storage, usage, transmitting, receiving, and processing. More simply, telematics may refer to sending, receiving and storing, information via telecommunication devices. Telematics devices and system have been applied alongside Global Positioning System ("GPS") technology integrated with computers and mobile communications technology in automotive information and navigation systems. In-vehicle devices that receive and transmit data wirelessly and communicate with on-vehicle computer devices via a vehicle communication network, such as a controller area network ("CAN") and the like, may be more generically referred to as machine devices. Machine devices are not only used to provide communication services to vehicles, but also to other machines that may include pumps, valves, sensors in an industrial environment, home and commercial equipment such as HVAC systems, alarm systems, multi-camera video systems, and the like; vending machines, point-of-sale terminals, and the like.

Other than the convergence of telecommunications and information processing, the term telematics may also refer to automation of various processes relating to the driving and using of automobiles or other vehicles. For example, a telematics system can report emergency situations to a telematics service provider's central location via a voice telephone call over a wireless communications network, or a message sent electronically over a network, including a wireless communications network and the Internet. Telematics also includes services such as GPS navigation, integrated hands-free cellular telephony, wireless safety communications, and automatic driving assistance and information systems such as traffic, restaurant, fuel, and emissions information. IEEE standard 802.11p refers to Wireless Access for the Vehicular Environment to facilitate and enhance Intelligent Transportation.

A telematics services provider ("TSP") typically operates a call center staffed with live operators who respond to emergency calls and to contact the appropriate responders to the emergency; the live operators also typically perform customer service tasks during real-time conversations with a user/subscriber, or with subscribers-to-be as they register their telematics device for service. The TSP also typically has a telecommunications operations center ("TOC"), which typically includes computer servers and other networking equipment to connect the server with various networks such as the Internet. A telematics control unit ("TCU") installed in a vehicle, either at the time of manufacture, or after the vehicle was placed in service, typically contains a GPS portion (which portion may be referred to as a GPS circuit or a GPS module), a cellular telephony portion (which may be referred to as a cellular, or long range wireless, portion, circuit, or module), and general computer electronics such as a memory, a general processor, I/O interface, etc., which are coupled to the GPS portion and to the cellular portion.

A subscriber typically pays a monthly service charge to the TSP. The TSP establishes and maintains a wireless service subscription with the wireless carrier, such as a cellular telephone service provider, so that the TCU can communicate with the TOC via wireless and Internet. This connection can also facilitate Internet availability and functionality for a subscriber in the vehicle thru the TCU. In addition, Internet connectivity facilitates a subscriber transmitting and receiving information between car and a personal computer, smart phone or tablet, or other computer device connected to the Internet.

A TSP typically establishes an account with a long-range wireless carrier, such as AT&T or Verizon, (the establishing of an account may be referred to as activating or provisioning a wireless account) so that a TCU can communicate across the wireless carrier's wireless (typically cellular) network. After a TCU has been installed in a vehicle, the vehicle's manufacturer, or the retail dealer selling the vehicle, typically obtains a unique identifier of the TCU, the vehicle's Vehicle Identification Number ("VIN"), a unique identifier corresponding to the wireless telephony portion of the TCU, and the vehicle owner's name and forwards the identifiers and vehicle owner's name to the TSP. The unique identifier of the wireless telephony portion of a TCU typically includes an International Mobile Subscriber Identity ("IMSI") and/or Integrated Circuit Card ID ("ICCID") for mobile network access devices using GSM, UMTS, or LTE wireless technology. The TSP may manually obtain the mobile unit's unique identifier and manually forward it to a wireless carrier via a voice telephone call, or completing form and mailing, or sending via facsimile or e-mail, to the wireless carrier. The TSP may electronically communicate with the wireless carrier using a predefined Application Programming Interface ("API") to activate wireless service. The wireless service provider typically begins billing the TSP for wireless service for the specific activated account upon activating the wireless portion of the TCU for wireless service. The TSP typically begins billing the vehicle owner/subscriber for telematics services upon receiving payment information from the vehicle owner.

In past subscription models, a vehicle may have been provided to the new-vehicle-owner without prepaid service (i.e., without having been separately paid for by the new-vehicle-owner), but with the telematics services provided on a trial basis for a period of time after the purchase of the vehicle. For one-way services like Automatic Crash Notification ("ACN") or Emergency Calling ("ECALL"), telematics service providers did not necessarily need customer information and customers could enjoy such 'Safety and Security' services without providing customer specific information until the trial period ended. If the new-vehicle-owner, or customer, chose to subscribe to additional services, (i.e., Internet Hotspot or Streaming Audio) it was up to the customer to establish contact with the telematics service provider and agree upon a method for payment for the service period extension.

High volume data services are beyond the scope of services that may be offered by vehicle OEMs and TSPs alike, but automobile manufacturers, (i.e., OEMs) want to add the capability to the vehicle. Vehicle/telematics customers desire the flexibility of an in-car connection, but don't necessarily want to pay for 'yet another monthly subscription.' Customers want the ability to use data from their existing rate plan "data bucket", which they may already pay for in connection with a personal device such as a smart phone, for a vehicle device, which may include Wi-Fi hotspot, or similar.

A designated and OEM-selected wireless operator provides existing telematics connectivity services; such a wireless network provider may be referred to as an anchor network. This arrangement means that all services, whether it is low volume/low bandwidth diagnostic services, firmware reflashing, or remote control services like remote door unlock or vehicle pre-conditioning, (which may be referred to as "Vehicle Centric Services" are typically provided by a single wireless operator. Communications to and from a vehicle telematics device typically use a single virtual 'pipe', or connection through a wireless network, from a local serving wireless network operator's towers, through an operator's packet core, and then the GSM Roaming Exchange ("GRX") or an IP Roaming Exchange ("IRX"). The GRX and the IPX are different names for an inter-operator IP network that allows mobile devices operating outside of their designated home, or anchor, network to reach back to the home network and access services there through.

Roaming on third party radio access networks ("RAN") allows a mobile device to have a wider coverage area than a single operator could normally provide, thus allowing nearly ubiquitous geographic coverage. Normally a single wireless operator provides service to subscribers through a combination of "home (or local-owned) networks" and some third party "roaming networks", sometimes even within the same geographical market area. These extensions to the RAN allow a network operator to provide a much larger virtual network than could normally be reasonably affordable. When a mobile device travels outside of the network of the network operator providing the service subscription, the network operator providing the subscriber's subscription services typically compensate the third-party network operator for airtime and data usage. Charges for usage outside of the home network are usually considered premium charges and are typically billed to a subscriber over- and above normal monthly fees associated with the basic subscription for wireless services.

Network operators usually assemble a set of third party wireless operator's networks to augment their basic "home" network. The "home" network normally refers to the RAN where normal operations are not considered premium services. Although any operator and RAN, whether home or roaming, can charge usage fees based solely on data consumption, the term 'premium' generally refers to services that are outside of the normal subscription plan and rates. Home charges are based on normal home rates and roaming charges are based on premium charges over and above the normal home subscription plan and rates.

Normal subscriptions in the home network are based on the wireless customer purchasing a preset amount of airtime or wireless data at a specific price. The price might be 1000 minutes of airtime for $10 or it might be 1 Gigabyte ("GB") of data for $10. Most wireless network rate plans are based on the customer purchasing a set amount of data and minutes of airtime in anticipation of the customer using that amount of data over the purchase period, for example, 1000 minutes of airtime and 5 GB of data for $60 for one month. If the customer uses more airtime or bytes of data, the customer will pay overage charges for usage. In addition to the base $60, if the customer travels to a market that is not part of the home network, the customer typically pays inflated charges, known as roaming fees, to the home network operator for the airtime or data usage in the roaming market. Typically the roaming fees are based completely on usage and the price is usually significantly higher than the basic airtime and data prices for usage in the home market via the home/anchor network.

As wireless data consumption and minutes-of-use have increased by customers, and as more customers use more devices that consume data, wireless operators have accommodated such increases in wireless data usage by offering bigger packages of data and perceptually lower prices. When a wireless customer purchases a tablet or notebook equipped with a mobile wireless data services plan, the customer might purchase a data plan, for example 10 GB of data for $80, to support usage by both the smart phone and the tablet. The perception of data at $8 per GB is better for the customer, while the wireless operator realizes that the $80 package is higher revenue per customer, but not necessarily 5 GB of additional usage by the customer because the customer now may use his tablet for reading his email that he otherwise might have read on his smart phone. The customer is happy with his, or her, lower monthly cost per GB while the operator is happy because it receives greater revenues but without a necessarily greater data/bandwidth usage by the customer.

Because of the specific overage fees and rate plans, the wireless operator conditions his wireless customers to maintain a rate plan that offers more data (sometimes significantly more data) than the individual wireless customer normally consumes. If a customer ever exceeds his allotted rate plan, most wireless operators almost punitively charge that customer for his, or her, extra usage. This strategy creates a dynamic where the fear of excessive and unpredictable usage charges for small overages encourages wireless customers to 'over subscribe' to data. In the end, for each separate account, wireless customers normally over subscribe to far more data than they will ever use.

A wireless operator understands and manages the customers' fear of overage charges. It is this fear of overage charges that keep the dynamic working for the operator. The typical customer purchases more than enough extra data and uses only a fraction of it. From an operator's perspective, this is called "breakage". If a customer buys twice as much data as he, or she, uses, the effective price is two times the apparent price. From a customer's perspective, if he, or she, is able to add multiple devices to his, or her, rate plan, this limits the breakage to that of a single rate plan. From an operator's perspective, more devices result in more usage and more GB overall sold to that particular customer. More GB of usage means perhaps a larger "bucket" of data with a larger cushion that the customer is willing to buy. It means that the customer is less likely to shift his, or her, account to another operator if he, or she, has multiple devices that are part of the same plan. Customers readily add new devices for a small sum of extra money, typically $10 per device. Everybody wins.

The desire to add new devices to multiple-device data plans is very strong. Its success has been established in the marketplace. For cost conscious customers though, connected cars currently are just another subscription that usually do not have a monthly subscription price or rate as low as another device such as an additional tablet or smart phone. Unfortunately with the methods that have been offered by the wireless operators and adopted by the automobile OEMs ("AOEM") and vehicle telematics providers, it is nearly impossible for a vehicle owner to add a new vehicle to an existing multiple-device data plan. In a typical scenario, an automobile OEM chooses a wireless operator (i.e., an anchor wireless network) that will provide wireless connectivity for telematics services, such as over-the-air updates, traffic information, navigation services, automatic crash notification, and the like. Normally the automobile OEM chooses a large operator with a likelihood of having as many native networks, and the largest geographic footprint as possible to minimize operating costs to itself and to its customers. Thus, in essence this means that an automobile OEM, or a vehicle telematics provider, will generally select one of a few (currently about five or six) large operators worldwide.

When an OEM has selected a wireless anchor network operator, due to 3GPP design limitations, until recently, all network traffic had to originate or terminate in that wireless anchor operator's network. More specifically, wireless traffic originated and terminated in one or two countries. All data usage traversed the IPX/GRX networks back to the home network of the selected wireless network operator that provided, provisioned, and supports a subscriber identity module ("SIM"). GSMA and 3GPP have anticipated the global roaming needs of such devices that include automobile telematics and have specified local breakout mechanisms. Local breakout mechanisms are part of the Forth Generation 4G network architecture, but still don't necessarily solve the problem. Even though the traffic is routed directly to the local Internet in a visited country, roaming traffic is still roaming and the local operator who owns the local RAN charges the home operator for the data usage, which results in premium charges to an end user.

Modern telematics devices usually carry two types data of traffic. Some traffic, for example diagnostics and firmware reflashing is carried on behalf of the OEM and the remainder of the traffic is carried on behalf of the driver, or a passenger, of the car. Similar to the local breakout needs, GSMA and 3GPP anticipated the need to two or more responsible parties for paying for network data traffic. A recent development in this space is the embedded SIM ("eSIM"). The eSIM is a Subscriber Identity Module that allows "over-the-air" personalization. Specifically, the eSIM allows a wireless operator or "subscription manager" to push the profile for a new wireless network over-the-air. Practically it removes the need to install a new "removable" SIM every time the subscription changes from one wireless network operator to the next. The eSIM has been considered a major boon to offering the consumer a local combined billing solution (meaning the consumer can combine his telematics data usage with his smartphone data usage). It is envisioned that an OEM or TSP can "push" a profile of a wireless operator of the vehicle owner's own choosing into the vehicle and the vehicle owner can combine the bill for his personal data services that he, or she, accesses while in the vehicle through a wireless data connection to a telematics device in the vehicle (i.e., via an in-vehicle Wi-Fi hotspot that connects to the internet through a wireless connection provided via the telematics device) with data services he consumes from his other devices. The diagnostic and reflashing services could be split out and billed separately, and directly to the OEM.

In places like Europe, where a given vehicle OEM may sell a given vehicle in every country, it is impracticable for the OEM to establish direct wireless operator relationships to placate every possible customer's selection of a wireless carrier for devices he, or she, may already own or use. With 30 countries and 3 or more operators per country, the list is long. An industry consortium is possible but would be a challenge. One overlooked aspect is that although the OEM is able to push a new SIM profile to a vehicle machine device, somehow, that OEM must also provision the new SIM profile into the business and operations systems that enable the subscription and billing for the new customer. Wireless operators are loath to allow outsiders and third parties to access the "keys to their kingdom" (i.e., to access billing systems and customer lists). Privacy rules make it tricky as well.

A second overlooked aspect of the eSIM technology is the need for vehicle centric services like diagnostic and reflashing services. There is a strong need for services like battery charge status that "reach out to the vehicle." Without a central connection, these services become insecure and difficult to manage. Once a new profile is pushed into an eSIM in a telematics unit, the OEM must actively manage the connection because without the connection, the OEM will loose the significant strategic value of having the car connected in the first place. Roaming prices in markets outside of the home market have remained a significant topic of discussion. In Europe, for example, a wireless consumer can easily purchase wireless data at less than $5 per GB in his home market. However, that same consumer will pay at least $50 per GB for data outside his home market. Roaming has been a traditional cash cow for network operators throughout the world. Regulations in Europe attempt to force changes to the free market system to encourage customers to use their phones outside of their home markets. According to some statistics, 80% of all users turn their data functionality off while roaming. EU regulations have attempted to eliminate roaming charges but have received great resistance from European network operators. Although the new regulations will take affect soon, they don't completely solve the problem of a customer being billed a high rate for data that he, or she, receives while roaming. Currently, roaming rate limits will only apply to consumer plans and significant limitations will apply to block enterprising customers from signing up for service with the lowest price operator in a market foreign to the customer's own true home market.

The future of the connected car industry in Europe is questionable if one considers the upcoming European regulations. It remains to be seen whether operators will allow an automobile telematics device to be part of a consumer rate plan for the purposes of the roaming costs and regulation, or whether operators will consider the automobile telematics usage part of the business and industrial market since the SIM subscription is most likely part of an OEM's consolidated fleet plan.

Current systems fit neatly into one of several types of systems:

Complete Roaming Environment: In this type of system, the OEM contracts with a single "prime," "home," or "anchor" wireless network operator and the prime operator creates roaming relationships with operators of "local," or "visited" networks in that provide wireless connectivity for markets that may not be served by the home, or anchor, network. The local operator has a defined price per minute of use and per Megabyte ("MB") of data. Airtime and data usage is billed by the local network operator to the prime network operator through inter-operator rates set either for all customers or for customer usage pursuant to a specific OEM/telematics service contract. The prime/anchor operator bills the OEM for a monthly reoccurring charge and the voice airtime and data usage rates. The local operator typically receives no monthly reoccurring charge for devices that don't use voice airtime and data. Typically the rates charged by the local operator are higher because the local operator does not receive monthly compensation.

Roaming SIM for Low Volume and Native Local SIM for High Volume: This is a hybrid model where all devices that consume only a small amount of vehicle centric data, for example diagnostics, firmware reflashing and limited remote control, remain in a complete roaming environment as described above. If the vehicle operator consumes more than a small amount of data, particularly for customer facing services, for example wireless hotspot or streaming audio, the prime operator may contract with a single local operator to purchase a local profile and the prime operator may utilize eSIM technology and 're-IMSI' the wireless vehicle device and operate the vehicle device as a local device in the specific country or market where the vehicle is domiciled. The local operator bills the prime operator for the monthly reoccurring SIM charge and the airtime charges used by the SIM. The local operator will bill the prime operator for all airtime and data usage by the low volume roaming devices. The local operator usually sells high volume data at a much lower price per GB because the local operator also receives a monthly reoccurring charge for the SIM and the local operator now has ultimate control of the SIM.

Native Local SIM for all devices: This model is one where a single mobile virtual network operator [MVNO] operates as a prime and aggregates the SIM profile and services for many local operators within a region. Each local operator provides the prime with a block of SIM profiles and the prime MVNO uses eSIM technology to re-IMSI the SIM to from the "anchor" profile to a local profile when the vehicle is sold to a specific customer and the domicile is determined. Each local network operator bills the prime MVNO for monthly reoccurring charges as well as airtime and data usage. This solution is successful if individual airtime or data usage is high enough to offset the higher monthly reoccurring charges. The MVNO must have MVNO agreements with each operator in each country and must operate a provisioning system that supports each of the local network operator's provision API's.

Each of the above systems has aspects that are advantageous relative to each of the others. A common aspect of the above systems is that each a single point of contact for the AOEM. The "Prime" mobile operator manages all wireless SIMs and wireless service. An alternative to the above model is for the AOEM or device maker to contract with independent operators in each operating area or country and arrange for wireless services. However, each of the above methods fails to provide a direct customer relationship and a consolidated bill for all of the customer's wireless telecom needs, for the delivery of high volume, high bandwidth data connectivity for customer-facing services which a consumer/driver would desire unless the vehicle's AOEM, or low bandwidth service provider, such as a telematics services provider, takes it upon itself to pay for all data consumed by the vehicle operators including high volume, high bandwidth data session flows while roaming, which is unlikely.

Solutions that may currently exist typically fit neatly into the categories previously described. In each case, an entity manages the relationship between the wireless operators who provide the RAN, the AOEM, and possibly the end customer. Both the AOEM and the managing entity have visions of massive subscriptions and massive profit margins on the backs of the local serving wireless network operators that have invested the capital in building their RANs. Further, the customer is meanwhile expected to subscribe to yet another bucket of data at inflated prices. Most likely, the automobile owner/operator has to create a new account with a new entity and in markets like Canada and Europe, that new entity might not even be a local entity, notwithstanding that a local wireless operator may be selling against himself by offering significant discounts to the AOEM or the managing entity.

In view of the aforementioned difficulties of operating the traditional telematics system using wireless services with existing business rules, a new system and method has been designed and deployed to provide high volume, high bandwidth service to telematics customers in order to insure long-term success. An aspect and benefit of the new system is the ability for an automobile owner/operator to include the purchase of airtime and/or data from his, or her, existing wireless provider that provides wireless services to his, or her, smart phone, tablet, or similar personal wireless mobile device. The customer's existing (i.e., local) wireless provider can provide the best customer service and the best prices for customer-centric data without the anchor network operator being involved in providing, and billing for, the customer-centric wireless services.

From a technology perspective, the simplest solution is the solution that has been deployed in vehicles from several OEMs in Europe for years. The solution involves a SIM card slot on the dashboard. As simple as this solution sounds, it has its challenges, especially for the diagnostics, firmware reflashing and remote control. Although the removable SIM, whether supplied by the customer, the local dealer, the distributor or OEM can work, and has worked in some situations in the past, from the security aspect, it is a non-starter for services that involve the OEM or TSP reaching out to the vehicles (i.e., vehicle-terminated services). Any vehicle-terminated traffic would be significantly challenged with security issues with a consumer SIM operating on what is effectively the open Internet. From the aspect of the consumer, and consumer facing services, the SIM slot on the dashboard is the best solution to the problem as it allows the customer to decide who provides the outgoing connectivity to the vehicle for consumer facing services. From a resource utilization perspective, current solutions are almost completely undesirable because the implementation usually depends on two communications radios (i.e., cellphones), and especially for the customer who has to purchase at AOEM markup, two complete sets of cellphones, and associated hardware like antenna feed line and antennas.

The AOEM has a belief that if a single radio solution is to be considered acceptable, and the SIM card of the telematics unit is to be programmable and adaptable to wireless operators in every market, then this is the ideal solution. And it may be acceptable to some portion of the customers who are willing to subscribe to a new wireless service with a new "bucket of data." It may not be acceptable to the majority.

Aspects described herein incorporate multiple components, but principally one new concept and technical system behind that concept. The principle novel concept focuses on aspects that facilitate local wireless operator participation in the consumer portion of wireless usage to a vehicle device, such as a telematics device. Aspects disclosed herein allow an automobile OEM to select an "anchor" wireless services provider. Much like the "prime" operator described above, the anchor operator manages the relationship with the AOEM for all vehicle-centric traffic. The anchor operator provides the "evolved packet core," or GGSN, for vehicle centric traffic. The anchor operator provides and operates the Home Subscriber Server ("HSS") that contains a list of IMSI values and an authentication center containing the subscriber key for authentication of a device associated with a given IMSI and a SIM installed into a vehicle's machine device. The anchor operator provides basic roaming service through roaming agreements with local wireless network operators. Preferably, the roaming agreements are established with all possible available local operators operating in a targeted service area. The anchor operator provides the OTA system to update the preferred Public Land Mobile Network ("PLMN") roaming list in the SIM.

A component that facilitates aspects disclosed herein is a management gateway, which may be referred to as a provisioning, analytics, and management ("PAM") management gateway that allows an AOEM, or telematics provider, and local operator partners (as well as the anchor operator) to jointly manage the SIM in a vehicle machine device. In existing wireless network operations, the SIM of a given device is carefully managed and controlled by a single entity, a single wireless operator, or its agents on behalf of that single operator. In the case of an anchor operator, the SIM heretofore has been managed by, and only by, the anchor or through management mechanisms delegated directly to the AOEM or the TSP. Even multi-tenant management platforms, as may be provided by entities such as Jasper Inc., segregate different operators' devices and SIM management. With Jasper devices, if an OEM has relationships with multiple wireless operators, each wireless operator has its own ICCID/IMSI (and hence SIM card) managed by the Jasper platform and the management is not holistic, but clearly segregated between the different operators. One wireless operator does not typically manage the SIMs of another wireless operator in an environment that uses a Jasper platform.

A second differentiating aspect disclosed herein, along with the PAM management gateway, are methods of providing localized service. In solutions currently envisioned by the wireless industry, a local ICCID/IMSI is installed using eSIM or similar technology in the SIM card if locally managed service is required. This provides the local management and local service aspect of the connectivity services. Aspects disclosed herein use a single anchor operator's ICCID/IMSI throughout the life of the wireless service; the IMSI of the SIM does not need to be changed in the machine device at the vehicle.

Wireless data and voice traffic is carefully managed in existing wireless networks. Various methods are established by the Third Generation Partnership Project ("3GPP"), a world wide network operator consortium that establishes methods, standards, and requirements for wireless network operation. Those methods may or may not be fully deployed by wireless network operators that own and operate local RANs that provide local wireless services to consumers. Aspects disclosed herein, including a PAM management gateway device, integrate with, and enhance, standards and solutions, including 3GPP and GSM Association "(GSMA") standards.

The PAM management gateway defines new technology that cooperates with the Operations Support System and Business Support System ("OSS") and ("BSS") that supports network services for wireless devices. The PAM gateway of an anchor wireless network provides a local network interface for interoperation with other wireless networks, such as local wireless network operated by one or more different operators than the operator of the anchor wireless. Local network interface ("LNI") 60 is shown in FIG. 1, which is further discussed infra. The local operators' networks provide local service to an end customer (consumer/vehicle owner/driver). The local network interface provides both an application programming interface ("API") and web services ("HTML") interface for management of wireless service, including the ability to facilitate, provision, activate, and control operation of a wireless device for customer-facing service. If a wireless machine device is completely disabled, meaning it has not been activated for wireless voice service or data connectivity for either vehicle centric service or customer-facing service, the local network interface can enable/activate/provision the SIM in the machine device for basic wireless service to support customer-facing services but not vehicle-centric services. If the wireless device already has basic service for vehicle centric services, the local network interface can enable the additional customer-facing service, in addition to the existing basic.

The PAM management gateway also has at least one interface for business-to-business ("B2B") customers such as an interface for Device Services Providers ("DSP"), which is shown as interface 58 in FIG. 1. Specifically, the PAM management gateway provides a B2B interface for automakers and/or Telematics Services Providers ("TSP"). The DSP interface includes an API and HTML interface for management of another aspect of wireless service. Unlike the local network interface described above, the B2B interface facilitates a user (such as a customer services agent of a telematics services provider) to enable and disable connectivity for vehicle-centric services for a specific device with a specific SIM card (or virtual SIM). DSP B2B interface 58 may be used to enable connectivity for vehicle centric telematics services that use typically small amounts of data, for example diagnostics, firmware reflashing, and vehicle remote control operations (remote door unlock, remote vehicle start or stop, etc.). The B2B interface 58 controls connectivity that is typically (but not necessarily) paid for by an OEM or TSP in conjunction with airtime and data usage for all vehicles in a designated fleet associated with the OEM or TSP. Vehicle-centric services may be (but not necessarily) carried through the IPX/GRX network from a local network Serving Gateway ("SGW") to an anchor network's Packet Gateway ("PGW"), which provides an SGi interface to the Automaker/TSP. Similar to the local network interface, the B2B interface would enable basic wireless connectivity and connectivity to the APN of the anchor network designated for vehicle centric traffic. If the wireless device has no established wireless service associated with it yet, the wireless device SIM would be enabled to then provide services. If the SIM already has service established, the SIM would be enabled for an APN of the anchor network for vehicle centric services. In the case of disabling, if the SIM does not have high volume, high bandwidth ("HVHB") customer-facing services, then the SIM can be completely disabled via the B2B interface; if the SIM has been provisioned and activated for HVHB services then only the APN and connectivity facilitators to the APN for vehicle centric services would typically be disabled.

The management gateway interfaces enable mobile devices using 3GPP standard methods for enabling a SIM card, including a provisioning connection 56 (shown in FIG. 1) to the HLR or Home Subscriber Server ("HSS") and the Policy and Charging Rules Function ("PCRF"), which are 3GPP Network Elements. And, the management gateway interfaces may disable mobile devices using 3GPP standard methods for disabling a SIM card including a provisioning connection to the HLR or HSS and PCRF. However, a given SIM is normally and strictly managed, provisioned, accessed, activated, and deactivated by a single network operator ((i.e., an anchor network as described herein or designated agent thereof), which typically provides the SIM. Aspects described herein confer privileges via the APIs or HTMLs of the corresponding interfaces described above that facilitate interoperation with a given wireless network by network components that are not part of the given network without posing a security or operational risk that a direct connection into the given network by components under operation and control outside the given network might otherwise pose. Each of the local network and B2B interfaces confer special privileges. For example, access to the local network interface of the PAM management gateway, via either the API or HTML interface, can support enable or disable functionality for high volume, high bandwidth data in a specific market or multiple markets. Thus, either a user, typically an employee of a local network, or a local network components automatically may cause the enabling, or disabling, of wireless service via the local network to a user equipment device, or SIM therein, that has been provisioned for service with the anchor network that PAM gateway may interface with (via another interface to be discussed infra). Such high bandwidth data may be segregated specifically by functionality embedded within the wireless device that routes IP data traffic according to a specific endpoint in the wireless network. This routing may be determined by an APN corresponding to the specific endpoint, but alternately it could be determined by other endpoint identifiers such as IP address, URI, URL, port number, or any other embedded tag contained in the IP record and it could include wrapping the IP packets with IP security methods similar to IPsec. Preferably when a local network enables high volume, high bandwidth data, the local network routes traffic through a local PGW owned and operated by the operator of the local network. 3GPP nomenclature refers to this as 'local breakout.'

If a user uses the API or the HTML interface of the B2B interface, a separate set of functionality may be granted to the wireless device. For example, vehicle-centric services like diagnostics, firmware reflashing, remote control, or flows of data related to vehicle functionality, performance, operation, or vehicle aspect may be segregated from high volume, high bandwidth data based on inputs to configuration or provisioning fields, queries, or similar means for inputting/receiving configuration information. Such low bandwidth IP data is preferably received at a vehicle device from a different endpoint than high volume, high bandwidth data traffic flows as described herein. This endpoint routing is facilitated preferably by APN, but alternately the routing could be controlled by other endpoint identifiers such as IP address, URI, URL, port number or any other embedded tag contained in the IP record. Endpoint routing may also include wrapping IP data flow packets with according to IP security methods such as, or similar to, IPsec. In an aspect, each interface provided at the PAM management gateway may be viewed as providing inputs to an OR function with respect to enablement of a wireless device and SIM. If one or another PAM interface has been specified to enable data, whether it is for customer-facing high volume, high bandwidth Internet connectivity or whether it is for the OEM enabled services like diagnostics, firmware reflashing, and remote control or similar services, then the wireless device and SIM is configured to be allowed to register on at least one network somewhere. It may be configured to operate on only one network, or it may be configured to operate on a group of networks or it may be configured to operate on all accessible networks. Another aspect of the device SIM enablement function is the access granted privileges. A device SIM may be enabled for a limited set of services, perhaps voice only or data only, and/or it may be enabled for a broader set of services. A device SIM may be configured to allow access on only one single network with one single service, perhaps data only on one mobile network operator's RAN, as identified by the Mobile Country Code ("MCC") and Mobile Network Code ("MNC") as identification codes that are typically implemented in 3GPP and GSMA environments.

The PAM management gateway may also operate, or control, a network-based Preferred Public Land Mobile Network List Generator ("P-PLMN-LG"). The P-PLMN-LG generates specific PLMN selection and roaming lists for use in steering a given mobile device to a specific network. Typically, the mobile device contains a PLMN list within the SIM card, whether virtual or physical, that manages the selection of PLMNs according to a priority order. The highest priority PLMN that is available and allowable is selected as a current local network according to standard 3GPP methods as described in 3GPP TS 23.122.

However, aspects described herein add a unique twist to the creating and updating of a PLMN. A default network for a given wireless device (i.e., an anchor network as referenced herein) creates and updates a limited PLMN list and provides that list to most, if not all, user equipment devices in a specific fleet of user equipment devices. For example, some networks load a specific list for domestic roaming within a country and outside of the country, and only networks operated by affiliated operators of the default network operator are listed; networks of operators that charge high roaming rates may be specifically excluded from a PLMN list. Because of limitations of the roaming list size and the operator scanning complexity, generally limited PLMN lists are sent to all subscriber devices. A user equipment device, such as a user's smart phone itself, has some ability to mark networks as unacceptable networks if the network regularly blocks access to the wireless device. In the unique twist, for a specific telematics solution for example, a PLMN list could be configured to operate on one or more specific operators' networks while excluding other operators' networks. This list could be considered a 'standard telematics preferred PLMN list,' or a P-PLMN list. If a component, or user of a component, of a local network accesses the PAM management gateway (e.g., via an API or a Internet web page interface) and enables high volume, high bandwidth services for a specific customer for a specific market or markets, the PAM management gateway instructs the P-PLMN-LG to generate a specific PLMN selection and roaming list (i.e., a P-PLMN list) for a given device to specifically enable wireless device scanning functionality to select the specific MCC and MNC combinations of specific markets. This wireless device SIM enablement could be done using one of several mechanisms contained within the SIM and wireless device and also in conjunction with other network elements in the wireless network. One way to use the SIM to enable operation on a specific network is to place the partner operator's MCC and MNC in the Home PLMN ("HPLMN")] or Equivalent Home PLMN list ("EHPLMN") (i.e., the anchor network's HPLMN or EHPLMN, respectively). Whenever the target MCC and MNC is available, it is selected.

Another method is to place the undesired/competitor operator's network's (i.e., a local network's) MCC/MNC within the desired (targeted) footprint in the forbidden list of a PLMN list (in some HLR/HSS implementations this actually may be the converse and the MCC/MNC may not be in the allowed list) within the HLR/HSS database so that when a wireless user equipment device attempts to access the forbidden PLMN, the wireless-network response to the registration blocks access with a "PLMN not allowed" response, or similar. This places the PLMN in the "forbidden PLMN" list. Another method to block unwanted access is respond with "No Suitable Cells in Location Area" which places Location Area ("LA") in the forbidden LAs for roaming which causes the wireless user equipment device to look for an LA that is not in the forbidden LA list.

Access control of a wireless device preferably can be controlled via three or four different network elements. As mentioned above, the HLR/HSS is an important network element that provides ultimate permission for a device to have some wireless functionality in a specific wireless market. The HLR/HSS partner networks (i.e., local networks) may have to be modified on a per subscriber basis (in the HLR/HSS) to allow operation in a certain area on a certain wireless operator's network while blocking wireless operation on other available networks that may be operated by a competitor to the selected wireless network's operator. In an example where operators A, B, and C offer wireless service in a country, a customer typically selects local operator A for high volume high bandwidth services in a country. The other operators are de-selected specifically for this customer by putting operator B and operator C in the forbidden list (or not including operator B and C in the allowed list in the HLR/HSS). If another customer selects operator B as his, or her, supplier for high volume, high bandwidth services, then for this other customer, operators A and C are added to the HLR/HSS forbidden list (or similarly A and C are not in the allowed list in the HLR/HSS). In order to manage two different classes of service provided by each operator, a different APN is preferably assigned to low volume data service than the APN assigned for a given local network for high volume service. Every access for low volume service will use one global APN that will preferably route data access from the SGW in the 'roamed-in' local network to the PGW of the anchor network. If low volume services are enabled for a specific wireless device and a specific SIM, then the APN for the endpoint in the anchor operator's PGW is specified in the HLR/HSS subscriber record. If low volume services are disable for a specific wireless device and a specific SIM, then the APN for the endpoint in the anchor operator's PGW is not specified in the HLR/HSS subscriber record. If high volume services are enabled for a specific wireless device and a specific SIM, then a second APN for the endpoint in the roaming partner/operator's networks PGW is specified in the HLR/HSS subscriber record. 3GPP TS 23.008 specifies the database structure of an HSS record. An HLR record is a subset of the HSS record. The HSS subscriber record has a list or a pointer to a "list of authorized visited network identifiers" that identifies the roaming partner/operator's network identities. Each possible roaming partner preferably should be listed in this list. A network identifier is identified with a network identifier type, for example home PLMN or home country, or visited PLMN. Alternative implementations may have multiple lists, for H-PLMN and V-PLMN. Visited networks may be identified as belonging to a group associated with the H-PLMN and belonging to another group identified as being associated with the V-PLMN.

Another set of lists associated with each subscriber in the HSS is part of the "Operator Determined Barring General Data." This list contains an authorized list of APNs for each subscriber called the "W-APN Authorized List." It is standard and customary for the W-APN Authorized lists to be categorically identical among types of customers. For example most customers would have access to a single APN, named for example "HomeOperator.MobileCountry.Broadband." This APN provides Internet access back to the home operator's network's PGW and the associated Internet access endpoint. If a SIM/subscriber device belongs to a machine-to-machine group of devices, for example the above described telematics use case, the HSS entry for the W-APN may not include standard internet access at all, but only access to an endpoint that is connected to a server of an automaker or a telematics services provider. The W-APN might be named "HomeOperator.MobileCountry.GM" or "HomeOperator.MobileCountry.Ford." The definition and structure of an APN is defined in 3GPP 23.003. Associated with each W-APN in the Authorized List is a W-APN Barring Type. Values to allow access to the specific APN are: allow access to the W-APN whether it is located in VPLMN or HPLMN; prohibit access to this HOME APN when in a VPLMN; prohibit access to the VISITED APN when in a VPLMN; prohibit access to the HOME APN when in a HPLMN and lastly prohibit access to public internet through any W-APN regardless of whether the subscriber is in a VPLMN or HPLMN.

Strategically naming network identifiers in the "list of authorized visited network identifiers" as HPLMN and VPLMN in conjunction with the allowed access point name will allow the HSS to enable a SIM/subscriber, regardless of whether it is in a home market or a visited market to access the high volume, high bandwidth services in those places where the SIM/subscriber has subscribed to local internet access using local breakout and it will allow global access to low volume diagnostics, firmware reflashing and remote control globally. This is an example and the APNs allowed could easily be reversed to allow global access to the internet and only local access to low volume diagnostics, firmware reflashing and remote control.

Another method that can be used to manage network access across multiple operators and multiple geographies or countries is to allow every APN in the HSS and modify the Subscription Profile Repository ("SPR"), the database for the PCRF, to provide different rules depending upon the specific operator and country. The functions of the Policy and Charging Control Architecture are defined in 3GPP TS 23.203. The advantage of using the PCRF is that a single APN with access to the Internet can be used for all packet data access to external sources (i.e., external with respect to the network that is operating, and operating according to, the given PCRF) with policy and charging functions applied on a per service flow basis or on a per application basis. Using the PCRF facilitates flexible control and charging for devices, in both the home and the visited markets. Setting "Service Data Flow Filters" allows individual services to be identified and controlled over a single APN if appropriate. It should be understood that there are methods described in TS 23.203 that allow categorization of different types of traffic, for example using specific ports for low volume telematics traffic.

Modifying the PCRF allows the HLR/HSS and SIM values described above to remain constant among all subscribers of a group, while granting individual permission to use certain services. Multiple APNs can be supported in an environment where the PCRF is the primary controller of access to network usage.

A third possible method of managing network access is by using an intelligent Diameter Routing Agent ("DRA") with roaming network access control functions. The use of a DRA to control roaming is a new concept being promoted by several of the new DRA solutions. In this model, the DRA "intercepts" the messaging from the external roaming partners and rejects operation on networks exclusive of the targeted roaming network. So in the example above with three operators A, B, and C in a country, if the partner network A is the network that the customer chooses as his provider for high volume, high bandwidth service, the DRA can 'intercept' the messaging from partner networks B and C and provide a "forbidden PLMN" (or similar) response message to populate the 'forbidden PLMN' locations in the SIM card. A company called "Evolved Intelligence," based in Bristol UK offers an exemplary solution called "Complete Control" that intercepts the incoming diameter/SS7 messaging and blocks roamer access to the network operators who operate networks opposite of the specific selected partner for high volume services. Low volume services in an area where the driver/operator/owner does not select a high volume high bandwidth service provider can operate on any available network as long as the anchor has an acceptable roaming agreement for low volume services. Ideally, the wireless device will select the operator with the best network coverage or the preferred operators based on the ordering in the preferred PLMN list contained in the SIM card.

An overall system implementing aspects disclosed herein may operate with one or more of the methods described above, the HSS based steering, the SIM based steering, the DRA based steering, or Policy Charging and Control management; or it may operate in a system that uses a combination of the above systems to deliver the appropriate network access to provide services that are financially attractive for the driver/customer to use. An example of the details of the solution might be to offer customers of a car company, for example Mercedes Benz, the ability to provide wireless hotspot and streaming audio in their cars. In the example, supplying these services in all geographies in the United States with an AT&T or Verizon SIM does not typically pose problems addressed by aspects described herein because AT&T and Verizon each have a nearly ubiquitous footprint that operates with a single data plan and a single subscription and covers the entire United States. Considering customers based in Canada, there are operators that provide similar capability, independently from each other and like the US, the operators there arrange with other operators for coverage with that Canadian SIM where the operator who provided the SIM does not have coverage.

However, consider the viewpoint of a car owner that typically operates his, or her, vehicle in a geographic area where wireless network access my not be available from a ubiquitous network provider and thus probably pays a different operator for a wireless services subscription for his, or her, personal smart phone, tablet, or similar. The car owner could subscribe with Telus for additional data services if Telus is the operator that the automaker selected to provide the SIM. This solution works for the Mercedes car owner who is also a Telus customer, but is not optimal for Mercedes car owners who happen to be customers of Rogers or Bell Canada for their smartphone services. The Telus SIM has limitations on it to preclude operation on other networks where Telus operates the RAN. Rogers and Bell Canada, as competing operators are unlikely to pay Telus for their own customers to roam on Telus network and consume high volume, high bandwidth data. Without the ability to take advantage of aspects disclosed herein, the Mercedes car owner typically must subscribe to an additional data plan with Telus (or possibly Mercedes as a data reseller) that operates on Telus network, with its associated costs and breakage of the new plan, unless the customer happens to have independently selected Telus for wireless services for the customer's handset. If the Mercedes car owner has no existing relationship with Telus, the customer would typically either sign up for data services with Mercedes (the OEM), the telematics services provider ("TSP") or Telus, (the wireless operator that provides wireless SIM connectivity for Mercedes (the OEM) in the example). In the case where the customer has an existing relationship (or a new one, for that matter) with the same wireless operator as the automotive OEM has selected there is an opportunity for splitting the bill between customer facing services and OEM vehicle centric services.

Suppose, for example, that there are three wireless network operators operating RANs and consumer wireless services in Canada (in actuality, there may be more). Further suppose that those operators are Telus, Bell Canada, and Rogers. For an AOEM, selecting a SIM for wireless machine devices manufactured for telematics use in their vehicles from any of the three might be undesirable because each of the three operators provides roughly one-third of the wireless telecommunications connectivity for retail customers in Canada (i.e., each covers approximately a one-third, substantially non-overlapping (with the other two operator's networks) geographic region of Canada). For telematics, selecting one will be exclusionary to at least two-thirds of the customers for high volume, high bandwidth data, from a split billing combined bill perspective, and for some, from a geographic coverage perspective. One operator's coverage area may include some area where another operator's network provides better coverage. From the perspective of the automobile OEM, it would be ideal to be able to provide low volume, low bandwidth services on any of the three, and the one specifically that provides the best coverage where the vehicle is located. Selecting a neutral fourth party SIM (i.e., supplied and provisioned for use on a network other than one of the big-three operators) that has roaming coverage on each of the three, with the coverage set to utilize standard 3GPP network selection without any predisposition to select any one or the other of the three operators would be the best solution. That ideal third party might be Verizon or AT&T where the SIM operates on all three networks without bias to one of the others.

Ideally, high volume, high bandwidth services could operate on the best operator as well. Unfortunately, roaming of Internet of Things ("IoT") has been structured by the wireless industry to minimize the monthly reoccurring charge ("MRC") and maximize the per-minute airtime and per MB data rates. This model strongly favors low volume services typically found with IoT devices but it has a strong negative affect on high volume, high bandwidth consumer-facing services. This has been planned from the beginning. One operator wants to maximize his own revenue opportunities with his own customers. This operator does not want to share the retail customers who came at a high acquisition cost, with outside wireless providers, or, for that matter with automobile OEMs.

One method used today is to provide a SIM card for the second GSM-2G/3G/4G wireless transceiver mounted in the car, designed specifically for customer centric services. As mentioned earlier, this is a very expensive solution. Another solution is for the automobile OEM to sell the data connectivity to his customers directly. This solution is not in the best interest of the wireless network operator as the wireless customer relationship is shared with another company that can move the service away from the customer's preferred wireless network operator. The best way is for the anchor network operator who has the relationship with the automobile OEM to steer the customer facing wireless traffic to the network of choice for the driver/consumer. This solution assumes that the driver/consumer knows where he, or she, principally travels and assumes that he select the wireless network for his own handset that provides the best coverage in the geography where the driver/consumer principally spends his time. Further, in selecting the wireless operator, the driver/consumer may make a conscious trade-off between coverage and cost, at the expense of coverage to some degree, to select the correct wireless network operator and network coverage that fits the driver/consumer's own budget.

Since it is generally impracticable using current technology to split wireless service coverage at a given location between two operators to a user equipment device having a single cellular transceiver, it is desirable to move all wireless service, including vehicle-centric OEM services, to the local wireless network that has been selected by the driver/consumer. For the OEM, as long as the vehicle has adequate coverage most of the time, and unless the driver/customer makes an unwise choice of preferred local network, the vehicle should have coverage most of the time via the driver/customer's chosen wireless network operator.

Working on the premise that the wireless operator who provides the SIM to the user equipment machine device has access to all operators and reasonable rates for low volume data usage, aspects described herein should reasonably facilitate the providing of high volume, high bandwidth customer centric service. Aspects disclosed herein contemplate that the PAM management platform supports defining a SIM by IMSI, ICCID, IMEI, VIN, MSISDN, or any other device identifier that can be agreed upon by users. The agreed-upon identifier may reference a database entry that includes a few data fields that identify the network operator selected by the driver/customer as his desired network operator for a selected geography. It is possible to select multiple operators' networks in multiple geographies, but it is not desirable to be able to select multiple operators' networks in a single geography, although it is possible and it may be prioritized. Additionally, for each local network operator selected by a consumer and named in the database, an IMSI, and an MSISDN, are entered by the local network operator. Device identifiers IMSI and MSISDN may be a virtual IMSI and virtual MSISDN identifiers and may be referred to as V-IMSI and V-MSISDN. A V-IMSI or a V-MSISDN may be referred to as a pseudo IMSI or a pseudo MSISDN, respectively.

A local network operator configures, through an API or HTML interface access, the record of his prospective driver/customer using the device identifier, preferably ICCID or VIN, which has been pre-populated by the PAM management platform's operators and the automotive OEM. The ICCID/VIN identifies the record entry and the local network operator actor, by virtue of his, or her, login credentials, will only be able to populate certain information into the database, controlling customer service while not affecting other information within the database. The partner operator actor (i.e., an employee of a local network operated by a network selected by a user of a vehicle for personal wireless services as well as for high bandwidth, high volume data flow service to a telematics device), cannot affect basic OEM service over an anchor network and the local network employee/agent can only affect customer service for the partner network operator's own MCC/MNC. The partner operator actor/employee/agent enters a pseudo IMSI into the V-IMSI field associated with his, or her, own MCC/MNC. The pseudo IMSI must be within a predetermined range of pseudo IMSI values associated with the local/partner network operator. The local network operator actor enters a pseudo MSISDN into the V-MSISDN field associated with the local network's MCC/MNC. Additionally, the local mobile network operator actor can select options that allow or utilize these credentials using his, or her, V-IMSI and V-MSISDN to operate in other markets as secondary, valid roaming markets, where the local network operator has agreed with the driver/customer that the partner network operator will be responsible for providing roaming service and will be financially responsible to the third roaming/local network operator for high bandwidth, high volume data flow provided via roaming service to a driver/customer. The driver/customer has responsibility to the partner network operator for roaming service charges for data and/or voice service incurred in this third market.

An additional function of the PAM management platform is billing management. Billing management is an aspect of the PAM platform. It is desirable to separate wireless billing charges for vehicle-centric services that are paid by the OEM (which may be referred to herein as "OEM service" or "low bandwidth data flow service") from high volume, high bandwidth services (which may be referred to herein as "driver services" or "consumer data flow services") that are paid for by the customer. Aspects described above manage, control, and separate data usage between the OEM and the Driver. As described above, these services may be controlled, routed, and separated by APN, URI, URL, Port, etc. Normal wireless network standards (3GPP and GSMA) have specified and defined billing methods that include information related to the above methods to identify the usage for the possibility of managing a split billing operation. The billing and charging methods for individual network elements have been defined by 3GPP standards. The inter-operator billing and charging methods have been defined by GSMA. The PAM management platform operates within existing 3GPP standards, but the platform sorts and manipulates records to assign usage to the OEM and to the driver's selected local network based on the methods used to separate the traffic.

In one implementation, using the traditional methods of "Offline Charging System" inter-operator billing and settlement, with "Transferred Account Procedures" ("TAP") records is managed by the PAM management platform. TAP records are fully explained in GSMA specifications, including TAP 3.12 Format Specification, version 32.3, 15 Sep. 2014. Methods for TAP exchange between carriers are well understood. TAP records are records that are generated by network components and derived from "Charging Data Records" or what was once known as Call Detail Records ("CDR"), where CDRs are generally an output of a wireless network element in the traditional wireless network. It should be noted that numerous CDRs might be generated by multiple network elements handling a single call or a data session. Some of those CDRs might be discarded and some might be used to reconcile with data from other elements or sources. Some CDRs may be generated by network elements within the roaming network and some CDRs may be generated by the home network.

Typically a third-party clearinghouse manages the exchange of TAP records and the financial settlement between operators. Syniverse is an example of a third-party clearinghouse that manages the exchange of TAP records and financial settlement between operators. The clearinghouse typically receives a fee for each TAP record generated by an operator and a percentage for each financial settlement transaction.

A visited network operator selects a clearinghouse from among a plurality of clearinghouses. Once the operator selects the clearinghouse, the operator submits TAP records for IMSIs and MSISDNs that are not designated as belonging to the set of home subscribers of the visited network operator's IMSIs and MSISDNs. A visited network operator may separate out certain TAP records for submission to a different clearinghouses or he may separate out TAP records for submission directly to a nearby operator where network usage and roaming between his network and the nearby operator is significant. (An example is T-Mobile and AT&T in the United States.) The operator may submit these records to the nearby operator directly to eliminate the costs associated with the normal and customary extremely high volume roaming between his customers and the nearby operator's customers. One clearinghouse may submit records to other clearinghouses if the initial clearinghouse serving the visited network operator does not have a relationship with the network operator that provided the SIM and that controls the IMSI/MSISDN of the visiting customer that generated the CDRs and hence TAP records.

The PAM management platform may operate as an additional clearinghouse where the TAP records for the specific devices/customers that are managed by the PAM management platform are identified by IMSI or MSISDN that fall within a predetermined range of an anchor network's IMSIs, or other device identifiers, and correspond to devices that are to be used for split data flow routing and billing (i.e., split between high bandwidth and low bandwidth data flows). The TAP records associated with the devices/customers preferably will be pre-sorted by the partner network operator prior to the submission of the bulk TAP records being submitted to a clearinghouse. If the records are transmitted to a clearinghouse, they will be subject to the charges that are normally assessed by the clearinghouse. Once the TAP records, which may be referred to as data session transaction information records, arrive at the PAM management platform, the records are sorted and modified by a Billing and Charging processing engine, and according to the type of traffic that was carried by the visited network operator that generated the TAP records. Some TAP records may identify OEM services based on indicators associated with low bandwidth vehicle-centric data flows within the TAP record and some TAP records may identify customer data services based on indicators associated with high bandwidth consumer data flows. Records associated with OEM services can be submitted preferably to an anchor operator's primary clearinghouse in the form they are received from the submitting visited network operator. The Anchor network operator then charges the automobile OEM and subsequently compensate the operator of a visited local network operator based on agreed upon roaming rates. Alternatively, the PAM management platform can provide services similar to the clearinghouse and a financial settlement between the anchor operator and the local operators can be facilitated. The PAM management platform can be operated by an anchor network operator, or it can be operated by a third-party management entity including a clearinghouse. TAP records may be submitted to the PAM platform billing and charging processing engine from different entities, whether directly from other visited network operators, other clearinghouses, or from the anchor operator's own billing and charging processing engine.

There are several different ways to process the TAP records associated with customer data services. These TAP records were sent to the PAM management platform and there was an associated financial charge "to" the management platform for every data record. In an aspect, the TAP records can be modified to insert the V-IMSI in places where the IMSI is used in the record. Further, the V-MSISDN can be modified to insert the V-MSISDN in places where the MSISDN is used in the record. Once the records are modified, they can be preferably returned to the originating visited network operator as a Returned Account Procedure ("RAP") record, or as an incoming TAP record.

In one embodiment, returning the record as a RAP record with a V-IMSI and V-MSISDN allows the record to be received back by the visited network operator and automatically reconciled by the visited network operator's billing and charging systems. This allows local systems to recognize through the reconciliation process that no financial settlement occur with each of these transactions. The RAP record, if handled properly and according to industry design resolves the "outgoing usage record" charge, incoming payment reconciliation problem. Local usage by a driver/customer on a partner/local network will not normally incur charges outside of the local network operator and preferably the usage can be associated by virtue of the V-IMSI and the V-MSISDN with a local driver/customer's existing data plan or multi-SIM data bucket. In another embodiment, a direct TAP record, containing the V-IMSI and the V-MSISDN, and returned to the visited network operator, can alternatively provide the visited network operator a transparent method of billing the driver/customer facing services to a local account. Since the outgoing financial charges are balanced with the incoming financial charges, they are reconciled without much difficulty.

In a third embodiment, a combination of a TAP and a RAP record could be used. A TAP record could be converted by the PAM platform into a RAP record without the substitution of the V-IMSI and V-MSISDN. This returned RAP would reconcile the outgoing financial charges associated with the TAP record. A second, zero rated TAP record matching the original TAP record, but with a V-IMSI or V-MSISDN can be sent to the visited network operator for actual billing and charging of the usage. Other alternatives include submitting a direct TAP record after modification and settling between the visited network operator and the management platform operator with records that will balance out directly, but support variations in the financial charging. For example, if the original TAP record reflected a financial charge of $1.00 for usage, which in most cases might be a charge reflective of M2M Roaming usage, a RAP record could be returned reflecting a financial charge of $0.90 to cancel out most, but not all of the charge. A second TAP record could be returned with the V-IMSI and V-MSISDN, matching the original TAP, but with a financial charge of $0.10. This returned financial charge in a TAP record might be more in line with local data rates associated with home customer usage.

The previously described methods using TAP records are considered the Offline Charging System ("OFCS").

A newer method for managing billing and charging usage is referred to as the "Online Charging System" ("OCS"). The TAP records described above are all generated from CDRs generated by network elements located in the visited network. This is the standard way for generation of roaming CDRs and TAP records in the wireless networks at the time this disclosure was written. The PCRF with an S9 interface, if used with the PAM management platform, may control whether OCS or OFCS is appropriate for a given data session. When using the OCS, online charging, subscriber spending and usage counters can be maintained to control, regulate and allocate usage of wireless services in real time. (Hence the name "Online Charging System.") The OCS is a function within the 3GPP wireless network. Through the S9 interface, roaming subscriber spending and usage can be transferred from the Visited PCRF to the Home PCRF. Once at the PCRF, counters and spending information will be collected and controls managed to control operation of the roaming network. By managing a proxy [OCS-PROXY] function on the S9 interface back to the partner/local network that is providing the wireless service to the driver/customer for customer services, the partner network can maintain direct byte-by-byte control of local customer service if desired. The messaging from the S9 interface is translated in real time from the actual IMSI/MSISDN of the SIM used into a V-IMSI/V-MSISDN recognized by the partner/local market network operator. The partner market network operator can associate this V-IMSI/V-MSISDN with the actual driver/customer's own smartphone bucket of data and while charging the customer accordingly. 3GPP TS 29.215 and 3GPP TS 23.203 have detailed information on the OCS and OFCS and S9 Interface.

The OCS system is an online system that supports real time management of data usage in an online or prepaid style. Generally the OCS supports both time- and volume-based charging models that "reserve" data debit units. During the course of a data session, if more data debit units are required, more data unit is reserved. Any unused data debit units are returned to the OCS server. The system allows prepaid operation without data usage overrun. In one embodiment, shown in FIG. 5, the actual Home-Policy Control Rules Function and Home Subscription Profile Repository can be used to allocate and manage usage for the device for rules established by the PAM during activation of high volume/high bandwidth service. Periodically, whether daily, weekly, monthly or some other defined interval, the Anchor Network Billing Domain can generate Charge Detail Records that are subsequently turned into TAP records, modified with V-IMSI/V-MSISDN and forwarded either directly or thru the applicable clearinghouse for delivery and application to the driver/customer's wireless account.

In some implementations, it may be desirable to support an "Online Charging Domain" in the visited network. Specifically, the mobile network operator that contracts with the driver/customer may desire to operate the entire Online Charging System within its own mobile network billing domain. This is desirable because it may be desirable to share prepaid data debit units directly between devices, perhaps a smartphone, tablet and telematics device without prearranged data allocations and without the risk of data overruns by the driver/customer. In this embodiment, shown in FIG. 4, the PAM establishes the rules with the H-SPR, which distributes the rules to the H-PCRF and subsequently the H-PCRF distributes the rules over the S9 interface to the V-PCRF. The V-PCRF distributes rules the Policy Control Enforcement Function ("PCEF") in the visited network (the visited network is the MNO with a relationship with the driver/customer for HVHB services). The Traffic Detection Function ("TDF")/PCEF provides Session Initiation/Termination, Immediate Event Charging ("IEC"), Event Charging with Unit Reservation, and Session-based Charging with Unit Reservations via the Gy/Gyn to the OCS system in the Anchor network. Normally the PCEF and TDF are contained within a single network element, the Packet Gateway. Those indications shall normally be acted upon by the OCS in the Anchor Network, but in this embodiment, the Anchor network OCS shall ignore those messages as they are part of a special group of devices as identified by IMSI or MSISDN or other identifier. As shown in FIG. 4, an Online Charging Proxy "intercepts" each of the applicable messages, modify the IMSI with V-IMSI and/or the MSISDN with the V-MSISDN, and forward the messages to the diameter address for the visited network's OCS. The Visited Network would subsequently treat the messages as another local message and reply back to the OCS-PROXY, which appears to the OCS as just another roaming network where the device "appears" to be roaming. The OCS-PROXY converts those responses containing V-ISDN or V-MSISDN into responses containing the actual ISDN or MSIDSN. The OCS-PROXY then forwards the responses back to the PCEF/TDF function of the visited network. All messages at the PCEF/TDF function interface use the actual ISDN/MSIDSN and all messages at the OCS interface use the V-ISDN/V-MSISDN.

Provisioning, defined previously, involves the API and the HTML interface of the local network interface used by the partner/local network operators to enable driver/customer services. This solution may result in developing a special interface at each Operator-Partner local interface or the performance of special procedures and human action with the HTML (Web Page). An alternative solution is suggested using GSMA technologies developed for the eSIM. It should be made clear that it is not necessary to utilize the eSIM and this disclosure does not focus on re-IMSIing the wireless device SIM.

GSMA has developed RSP Architecture Version 1.0 dated 23 Dec. 2015 and RSP Technical Specification Version 1.0 dated 13 Jan. 2016. This specification generally outlines a method for distributing a SIM card token (digital SIM card subscription). It was designed for a new generation of smaller, lighter, mobile-connected devices that are too small to support a changeable SIM device. The process starts with a consumer buying a device and then going to his selected wireless operator and purchasing a voucher. The voucher is purchased on the consumer's existing contract or the consumer negotiates a new contract. The voucher may be on a plastic card (like a credit card) or on a printed page containing a bar code and a QR code. The bar code contains the ICCID (similar to the above, and in general, mathematically related to the IMSI) and the QR code and a scratch label with a PIN and PUK contained hidden. The bar code (IMSI) is connected to the contract at the point of sale. After purchasing the card or page from the retailer, the consumer can, at his own convenience utilize a smart phone application to pair with the target device and his smart phone (using short range wireless services like Bluetooth or Wi-Fi) then scan the QR code. The smart phone app connects to a backend system. The backend system creates an eSIM profile and encrypts that profile and subsequently downloads the eSIM profile to the smart phone. The eSIM profile is downloaded from the smart phone to the target device and the software on the device activates the target device.

The aforementioned process is created to activate devices and download eSIM profiles, which are not necessary for use in a system with a PAM management platform, but it creates a customer SIM and device profile attached to a customer subscription and account. It is well understood that one's automobile device could be a target device and one could pair his, or her, smart phone with the vehicle device using Bluetooth or WiFi and subsequently push an eSIM profile directly to vehicle device. This accomplishes the solution of creating a wireless subscription for customer facing services, but it lacks the functionality for the OEM facing services. Specifically, it lacks the methods for allowing the OEM to communicate directly to the vehicle from the OEM backend. It lacks the necessary security normally associated with dedicated APN services for OEM services. It also lacks the functionality for the driver/customer to split the bill with the OEM, with the OEM paying for the OEM portion of the bill. However, it pulls an eSIM profile from the driver/consumer's selected wireless operator. The eSIM profile contains the ICCID, IMSI and MSISDN. These are elements that are typically populated by a wireless network operator into a partner/local network operator database portion of the PAM management platform.

The standard solution and mobile application (smart phone app) can be modified specifically to support the PAM management platform to eliminate the heavy lifting done by the IT department personnel of the visited/local/partner mobile network operator (i.e., a network operator that partners with an anchor network operator in an environment that uses a PAM management platform as described herein). The visited mobile network operator would operate the eSIM Profile and Voucher Generator. See FIG. 8. A modified smart phone app may be operated specifically for the management platform and the automobile OEM. This smart phone app may capture the eSIM profile, much the same way as it currently captures the eSIM for a small wearable device. Instead of connecting via Bluetooth or Wi-Fi to a small wearable device, the smart phone will connect to the disclosed management platform Profile and Voucher Subscription Converter ("PVSC"). The PVSC will manipulate the Provisioning and SIM Management platform to install the necessary eSIM credentials to facilitate the operation of driver/consumer facing data services. Those credentials are loaded into the database using the identifier for the vehicle which could be, as described above, the VIN, IMSI, ICCID or other wireless device identifier along with the IMSI (or ICCID) and MSISDN received through the voucher. The IMSI and MSISDN received from the voucher are installed as the V-IMSI and V-MSISDN. The V-IMSI and V-MSISDN may be referred to as a pseudo IMSI or a pseudo MSISDN, respectively, or generically as a pseudo device identifier.

SUMMARY

A method may facilitate split billing of data traffic flows of a data session, which method may be performed by a provisioning, analytics, and management platform in communication with a machine mobile device services provider or in communication with an anchor mobile network. The method may include receiving one or more data session transaction information records wherein a unique device identifier, or a machine device identifier, is included in each data session transaction information record, and wherein the unique identifier corresponds to an anchor network that is associated with the unique identifier and is within a predetermined range of identifiers that have been associated with a given device services provider. (E.g., the unique identifier may be an IMSI that includes the MNC of the anchor network and that falls within a range that has been allocated exclusively as being associated with a telematics services provider that provides services to devices in vehicles manufactured by a particular manufacturer or to devices of different manufacturers' vehicles that subscribe to services of the services provider.) A machine device identifier may be associated with a machine device that preferably is a wireless communication device and that preferably is capable of moving, or being moved, between different wireless mobile networks. The method may include analyzing the one or more data session transaction information records to determine for each record a traffic class, from a plurality of traffic classes, corresponding to traffic associated with the record being analyzed based on an endpoint identifier included the record being analyzed, wherein the management platform is configured to recognize different endpoint identifiers as being associated with different classes of services. The method may include replacing the device identifier with a pseudo device identifier in data session transaction information records having an endpoint identifier that corresponds to a premium class of data traffic, such as high bandwidth data traffic.

Data session transaction information records that have been analyzed and contain pseudo device identifiers, or that have been determined to corresponds to a low bandwidth endpoint and thus have not had their device identifier replaced with a pseudo device identifier, may be referred to as processed data session transaction information records. The method may cause the returning of the one of the one or more data session transaction information records to a local mobile network operator associated with the pseudo device identifier if the machine device identifier contained in the data session transaction information record was replaced with the pseudo machine device identifier.

The method may further comprise causing the returning of the one of the one or more data session transaction information records to an anchor mobile network associated with the machine device identifier if the machine device identifier contained in the data session transaction information record was not replaced with a pseudo machine device identifier.

The machine device identifier may be an International Mobile Subscriber Identity and the pseudo machine device identifier is a pseudo International Mobile Subscriber Identity. The machine device identifier may be a Mobile Station International Subscriber Directory Number and the pseudo machine device identifier may be a pseudo machine Mobile Station International Subscriber Directory Number.

The data session transaction information records may be TAP records or Diameter records containing Gy/Gyn messages and responses.

A plurality of data session transaction information records may be received substantially simultaneously as a batch of data session transaction information records and processed data session transaction information records may be returned substantially as a batch of processed data session transaction information records.

A machine device identifier that has not been replaced typically corresponds to an anchor mobile network; a pseudo machine device identifier typically corresponds to a local mobile network that is not the anchor mobile network, and wherein the local mobile network is typically a network that a user has selected as a preferred mobile network for personal service in connection with a mobile device that is not necessarily related to the machine device.

BRIEF DESCRIPTION OF THE DRAWINGS

FIG. 6 illustrates how a Voucher may be used to manipulate the PAM configuration for provisioning setup of HVHB services.

DETAILED DESCRIPTION

As a preliminary matter, it will be readily understood by those persons skilled in the art that aspects described herein are susceptible of broad utility and application. Many methods, embodiments, and adaptations other than those herein described as well as many variations, modifications and equivalent arrangements, will be apparent from or reasonably suggested by the substance or scope of the aspects described herein.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise exclude any such other embodiments, adaptations, variations, modifications and equivalent arrangements, the present invention being limited only by the claims appended hereto and the equivalents thereof.

Figure 1:
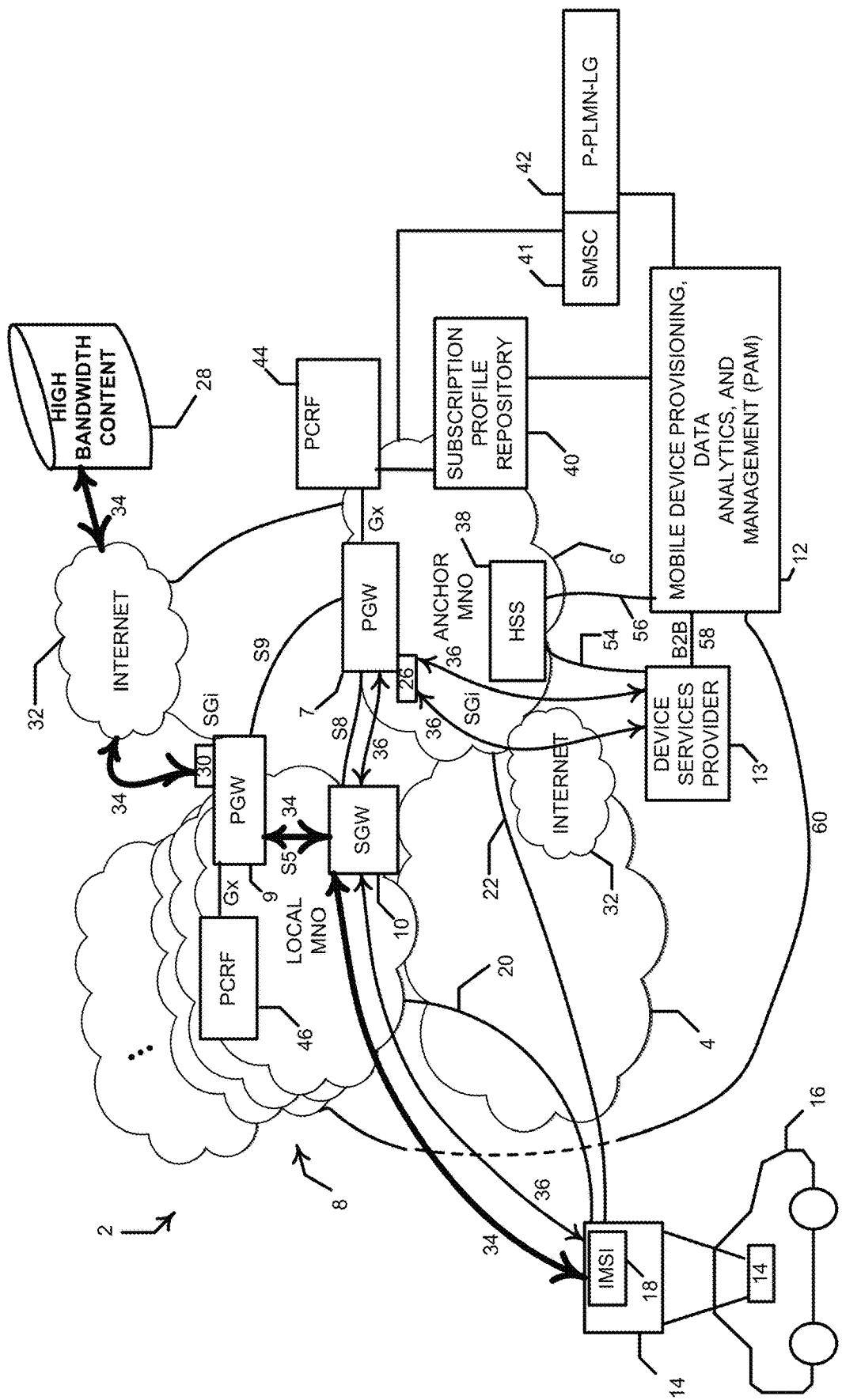
FIG. 1 illustrates a network system for analyzing and managing traffic between a single device and multiple content providers in an environment having a plurality of wireless networks.

Turning now to the figures, FIG. 1 illustrates a network system 2 for analyzing and managing traffic between a single device and multiple content providers in an environment having a plurality of wireless networks. A communications network 4 may include wireless communication networks, such as 3G, 4G, LTE, CDMA, etc., and wired, or wireless, links that connect, and provide interfaces to, components thereof. An anchor communication mobile network 6 having anchor packet gateway 7, and a plurality of local mobile networks 8, each having their own respective local packet gateway 9 and local serving gateway 10, operated by an anchor mobile network operator ("MNO") and one of a corresponding plurality of local MNOs, respectively, are shown as a separate networks that overlap with communication network 4. However, it will be appreciated that a single cloud may be used to collectively represent one or more communication networks for purposes of clarity. One of the plurality of local networks 8 may be a preferred network of a preferred network operator of a consumer (e.g., a network that a consumer pays of monthly mobile phone/device service for a personal user device.)

System 2 includes a data analysis and management platform 12, which may be referred to as a provisioning, analytics, and management platform ("PAM") that couples with, is part of, or is in communication with, anchor mobile network 6. Anchor mobile network 6 may be associated with a device services provider 13, that provides services, over-and-above network and connectivity services, to wireless machine devices, such as telematics devices, or other Internet of Things ("IoT") machine devices, represented by telematics device 14 shown located in vehicle 16 in the figure. Machine device 14 typically has a unique identifier associated with it that uniquely identifies it, or a subscriber associated with it. For example, a mobile user equipment device ("UE") such as a user's smart phone, or a machine device, such as telematics device 14 associated with vehicle 16 typically includes a International Mobile Subscriber Identity ("IMSI") 18, which is a unique identifier that comprises a country value (typically referred to as a mobile country code ("MCC") that uniquely identifies a country that a mobile operator operates in), a network operator value (typically referred to as a mobile network code ("MNC") that uniquely identifies a mobile network services provider/operator), and a subscriber identity value (typically referred to as a mobile subscription identification number ("MSIN"). Together, the country value, the network operator value, and the subscriber identity value compose IMSI 18.

Machine device 14 may communicate via preferred network 8 as shown by wireless link 20, or with anchor network 6 as shown by wireless link 22. Links 20 and 22 merely illustrate that when device 14 communicates via communication network 4, it typically has a wireless link to a particular wireless network, (i.e., preferred network 6 or anchor network 6, respectively), depending on its location (i.e., whether it is within range of a wireless transmit/receive node, such as an eNode B ("eNB") in a Long Term Evolution ("LTE") network).

In a typical scenario where device 14 is a telematics device in a vehicle, device services provider 13 may be a telematics services provider that may wirelessly provide, or manage, services to vehicle 16, and user/occupant devices (such as wi-fi hot spot service, over-the-air software updates to various components and modules of the vehicle that may be connected to the telematics device via a vehicle communication bus, such as a Controller Area Network ("CAN") bus) located therein. It will be appreciated that some services, such as over-the-air updates of software, automatic crash notification messaging, and voice communication from vehicle 16 between an occupant of the vehicle and a live operator are relatively infrequent compared to a user's in-vehicle internet browsing and streaming. These infrequent types of services may be referred to herein as vehicle-centric services that are typically low bandwidth or low data types of services, while internet browsing, music streaming, video stream, document downloading, e-mail messaging, SMS messaging, and the like, may be referred to as consumer services, that are often data-intensive as compared to the vehicle types of services that infrequently occur between vehicle devices and a telematics operator either directly or as an agent for a vehicle original equipment manufacturer ("OEM").

A telematics services provider may have arranged for its networking equipment 13 to use endpoint 26 of anchor network 6 to transport vehicle-centric services while a consumer may have arranged for his, or her, smart phone table, or other wireless devices, to use local network 8 to transport consumer services, which may be delivered from a content provider server 28 that stores and typically provides music, video, e-mail, or cloud storage documents, to a user device. In the figure, consumer service content is labeled in bold font as "HIGH BANDWIDTH CONTENT" and a bold flow path 34 is shown between content provider server endpoint 30 to vehicle machine device 14 to highlight that consumer content typically comprises a large amount of data transported over a high bandwidth, high data rate wireless connection compared with vehicle-centric services that typically comprise much lower amounts of data and typically need much lower data rate/bandwidth connections, shown by flow path 36 as non-bold to indicate the lower data requirements. Flow path 36 may occur via an interface with endpoint 26 over the Internet 32, or via a connection other than the Internet, such as, for example, a virtual private circuit using IP protocol. FIG. 1 shows two paths 36 to represent two alternative embodiments of implementing a network connection between a device services provider's equipment 13 with anchor network's equipment 13 for providing device services via the anchor network to vehicle device 14.

Each segment of flow path 34 is shown with a large arrow in the downlink direction and a smaller arrow in the uplink direction to indicate that the high bandwidth traffic flows from a content server 28 toward a user but traffic in the uplink direction from user device 14 to a content server typically is a much smaller traffic flow (i.e., amount of date or data packets). High bandwidth traffic may be referred to as being of a premium class. Management platform 12 logically connects with HSS 38, subscriber profile repository 40, and P-PLMN-LG 42. Subscriber profile repository 40 is shown in communication with PCRF 44 of anchor network 8 and PCRF 44 communicates with PGW 7 via a Gx interface. PGW 7 communicates with PGW 9 via an S9 interface; PGW 9 communicates with PCRF 46 via another Gx interface. It will be appreciated that the interface types discussed are in reference to a LTE network, but that similar interfaces and corresponding protocols may be used between network components that are similar to the ones discussed above.

Figure 2:
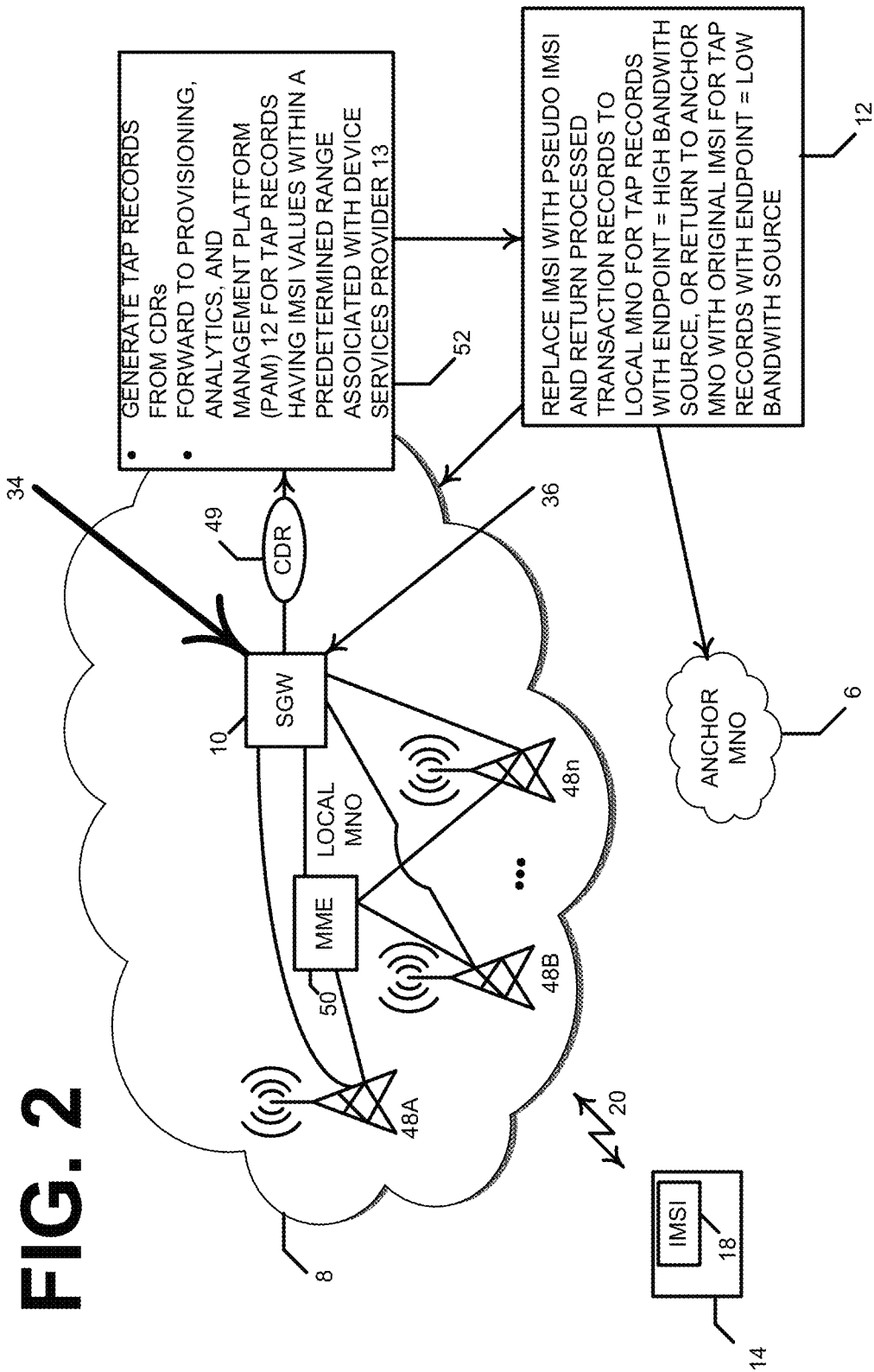
FIG. 2 illustrates a local mobile network environment.

Turning now to FIG. 2, the figure illustrates some details of a local mobile network 8. A mobile device 14 having corresponding IMSI 18, that is unique to the mobile device, communicates with network 8 over wireless link 20. Network 8 typically includes a plurality of eNodeB stations 48A, 48B, through 48*n*, which are connected via an S1-MME interface to Mobility Management Entity ("MME") 50. eNodeBs 48 are also shown each connected via an S1-U interface to SGW 10, which in turn is connected to MME 50 via an S11 interface. SGW 10 typically controls routing of high bandwidth traffic flow 34 and low bandwidth traffic flow 36, from endpoints 30 and 26, respectively. Endpoints 30 and 26 may have access point names associated with them for use in identifying traffic flow sources.

SGW 10 typically generates electronic call detail records ("CDR") 49 that give traffic flow, or traffic session, information details, including amount of packets, bytes, IMSI 18 of user equipment mobile devices 14 and source (i.e., an APN or IP address associated with endpoints 26 or 30) associated with a given data session. Various electronic components of network 8 convert call detail records 49 to electronic data session transaction information records, such as TAP records. Such electronic data session transaction information records are not paper records, are not records that are readable by human vision, and are not records that are modifiable by a human, such as by a pen or pencil. They are records that are generated in electronic format by network components of a wireless mobile network, that may be forwarded to network components of the same or different network that generated them, are processed by a network component that is different that the network component that generated them, and are returned to a network component of a wireless mobile network. In other words, humans cannot physically interact with, view, analyze, revise, receive, transmit, forward, or return, data session information transaction records. Data session information transaction records are generated by components of wireless mobile networks and contain information, specifically an endpoint identifier that corresponds to a particular network through which data of the data session was transported. Thus, data session information transaction records are electronic messages, records, packets, or other similar means for transmitting transaction information between electronic communication networks. The term data session transaction information record may refer to Diameter records containing Gy/Gyn messages and responses. Although information contained in a data session transaction information record could possibly be extracted and placed into a paper record, or other format readable by a human (e.g., a spreadsheet, aspects described herein exclude such formats. Indeed, such information is typically so voluminous that it would be impracticable for a human to process such records. The components that receive and process CDR records may include one or more clearinghouse platforms that process CDR records. The various components and platforms that process CDR records are shown in aggregate as components 52. After generating data session transaction information records, components 52 forward the data session transaction information records to PAM 12 if a device identifier, such as an IMSI, in a given record refers to a device of an anchor network, such as an IMSI that is associated with Anchor network 6. PAM 12 analyzes data session transaction information records that correspond to CDRs 49. For TAP records that correspond to a high bandwidth endpoint, PAM 12 modifies the IMSI/MSISDN, changing to V-IMSI and/or V-MSISDN, and returns the data session transaction information records to components of local network 8 for further processing, charging, and billing by the operator of local network 8 to the user. For data session transaction information records having endpoints that correspond to a low bandwidth endpoint (i.e., records that contain an endpoint identifier such as an IP address or APN for endpoint 26) PAM 12 returns, or forwards, data session transaction information records to components of anchor network 6 for processing, charging, and billing by the operator of anchor network 6 to the user.

Figure 3:
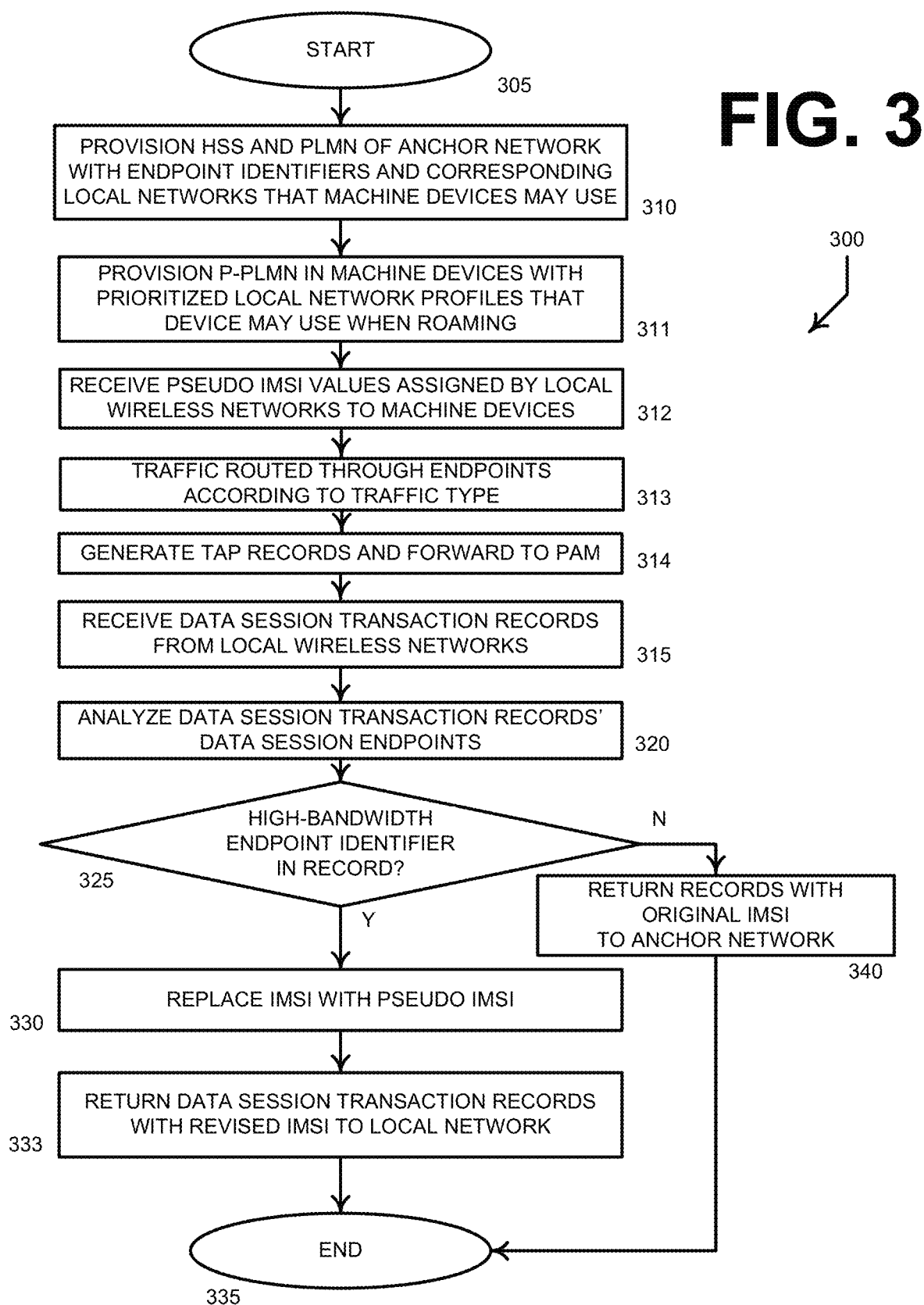
FIG. 3 illustrates a flow diagram of a method for providing data session transaction records to a local network that provides high bandwidth traffic flows to a user equipment device.
Figure 4:
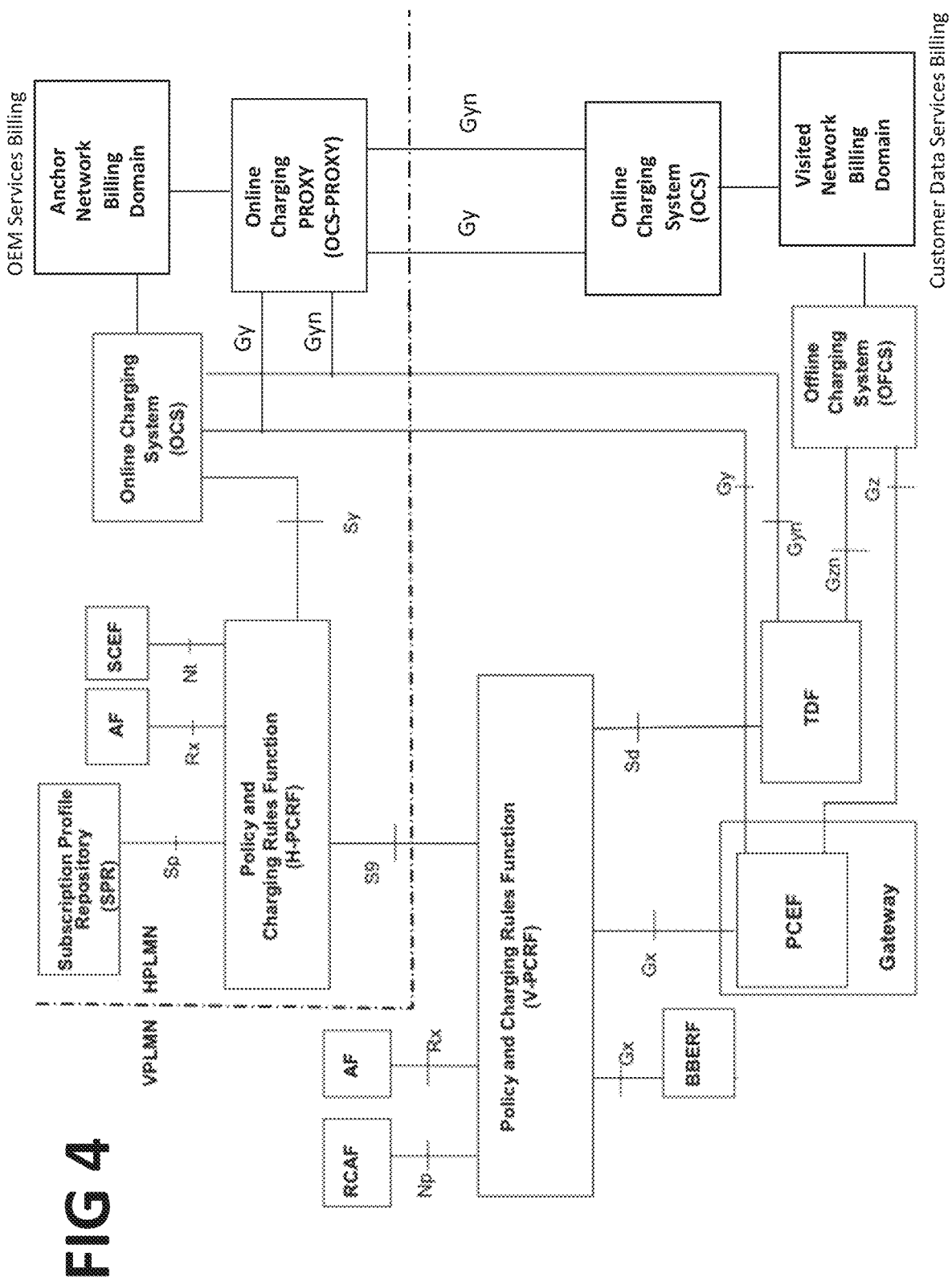
FIG. 4 illustrates the Online Charging System function spread between the Home PLMN and the Visited PLMN and the Online Charging PROXY function.
Figure 5:
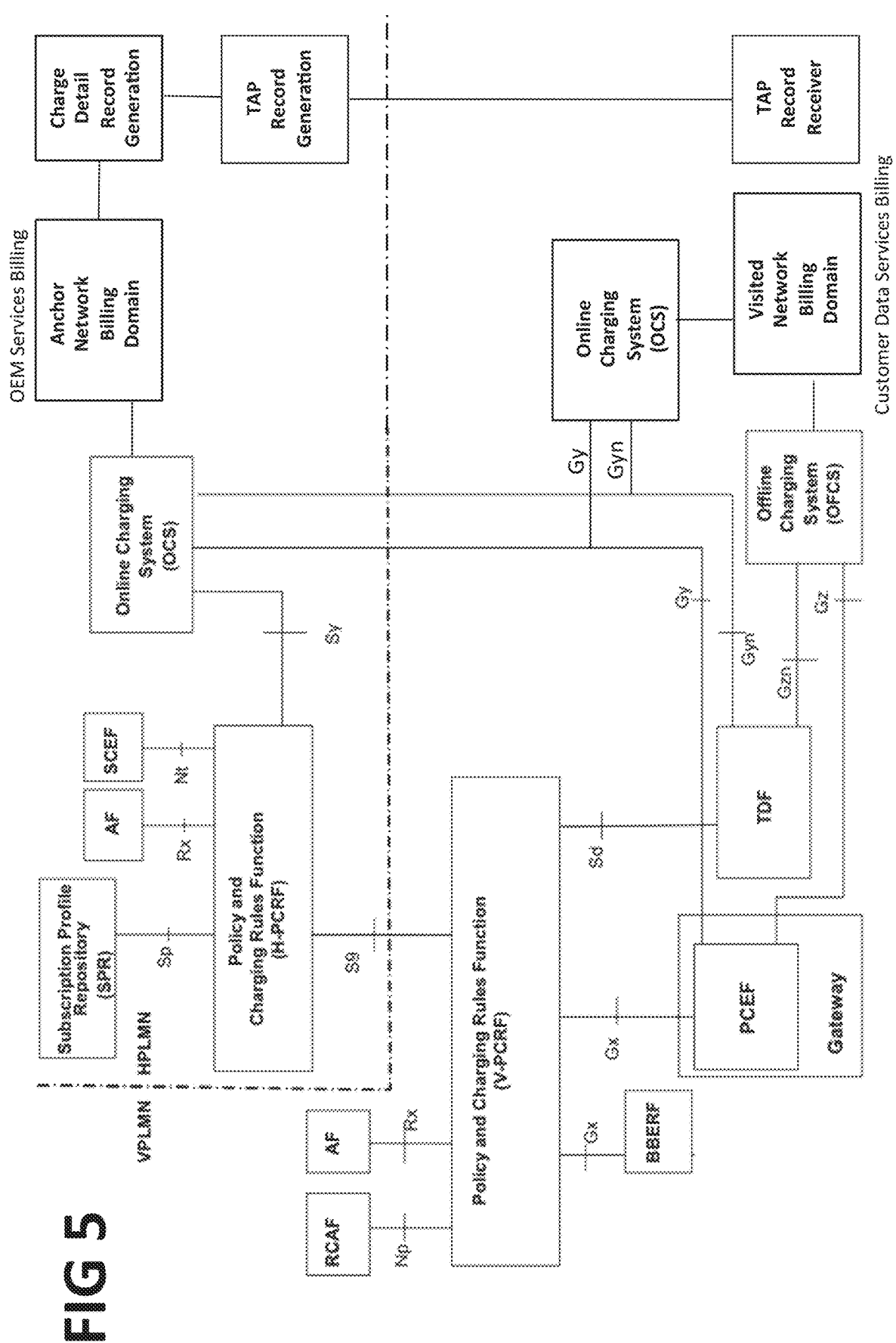
FIG. 5 illustrates the Online Charging System function spread between the Home PLMN and the Visited PLMN and shows how prepaid or managed data units can be allocated and billed using TAP Record Generation in the Anchor PLMN.

Turning now to FIG. 3, the figure illustrates a flow diagram of a method 300 for providing data session transaction records to a local network that provided a high bandwidth traffic flow to a user equipment device instead of providing the data session transaction records to an anchor network that is associated with the user equipment device but that did not provide the high bandwidth traffic flow to the user equipment device.

A user equipment device typically includes a device identifier, such as an IMSI, or similar unique identifier, may include a telematics device that is built into a vehicle and that communicates with various vehicle components via a CAN bus, or similar, and that provides vehicle connectivity to an automotive manufacturer's server, a vehicle fleet manager's server which fleet may include a vehicle that includes the user equipment device, or a telematics services server that performs services for a vehicle manufacturer or a vehicle fleet manager, such as server 13 shown in FIG. 1.

A user device may include a device installed into a vehicle after manufacture of the vehicle by an aftermarket vendor, supplier, services provider, or other entity that may, or may not be, the vehicle's OEM. A fleet may include automobiles, trucks, vessels, aircraft, drones, tractors, and the like. A user equipment device may also include a user's smart phone device that runs telematics software and that communicates with a vehicle computer when proximate the vehicle, either via a wired or wireless link, and that may provide vehicle connectivity to a telematics services server.

The PAM may prioritize the local network information according to data rate, data consumption, or other similar attribute that reflects data usage above a predetermined high-data threshold, such as, for example, traffic that is sourced from an endpoint that may provide high bandwidth content, such as streaming video, streaming audio, e-mail traffic, document and file download, real-time traffic information service, navigation services, voice call traffic, and the like.

A user may create, update, or revise local network information in a user equipment device using an interface that that the user equipment device may provide, or that may be provided via the PAM, or via a device services server, such as telematics server.

Data traffic flows that correspond to infrequent or low bandwidth content that are associated with an endpoint of an automobile OEM server, a fleet manager server, or a vehicle telematics services server may be associated in the user equipment device with an anchor wireless network 6 (as shown in FIG. 1). Examples of low bandwidth traffic flows include over-the-air ("OTA") updates of vehicle component software, automatic crash notification, vehicle service reminders, vehicle service bulletins, insurance notices that may include the impact of driver behavior as determined from vehicle sensor information that relates to vehicle operation such as acceleration, braking, number of left turns, passing through an intersection during a yellow light (if real time traffic control information is available and synchronized with operation of the a given vehicle and wherein a driver may be identified by a device identifier, such as an IMSI, of the user equipment device), and the like.

Local network information may include updates to a Subscriber Identity Module ("SIM"), or similar means for storing wireless network access information such as embedded SIM ("eSIM"), onboard memory of a device, etc., with a new PLMN selector list having local network information corresponding to user-selected local MNO, or MNOs, as top priority. The PAM may also provision, or update, a Policy and Charging Rules Function ("PCRF") of one or more local networks that correspond to the user-selected one or more preferred local network operators (typically a network operator, or network operators, that a given user already has a wireless data plan with).

Method 300 starts at step 305, after which a provisioning, analytics, and management platform (i.e., PAM 12 shown in FIGS. 1 and 2) provisions at step 310 one or more components of an anchor network (i.e., networks 6 shown in FIG. 1). Components that may be provisioned at step 310 may include HSS 38 of anchor network 6 and an anchor-network-maintained PLMN list that corresponds to services that may be received by subscribers from and provided by services provider server 13. Initial, or original, provisioning of HSS 38 that may have occurred before the performance of step 310 may include the associating of IMSI 18 of device 14 that is in vehicle 16 with anchor network 6 such that whenever device 14 conducts wireless communication it either performs the communication wirelessly with anchor network 6, or via a local network 8 while roaming in a geographic area where wireless services of the local network are available but where services of the anchor network are not available. Such original provisioning may include associating in HSS 38 an endpoint 26 of anchor network 6 with IMSI 18 so that data traffic flows from services provider server 13 are associated with endpoint 26, or an identifier of the endpoint, such as an APN, and so that traffic flows corresponding to IMSI 18 are permitted from endpoint 26.

Continuing with discussion of step 310, a user (i.e., a driver or owner of vehicle 16) may use a user interface, for example on his, or her, personal smart phone, via a web browser, to access a web site, or via voice, or in person, establish a local high volume, high bandwidth service relationship with a local MNO 8, which will access PAM 12 to specify one or more preferred local networks 8 that the user may desire to use for consumer content data traffic flows (which are typically high volume, high-bandwidth-requirement data flows), such as traffic flow 34 shown in bold in FIG. 1. PAM 12 may receive provisioning information of a user's preferred local network, or networks, via a local network interface 60 of the PAM. (For clarity, interface 60 is shown as a line that is partially dashed in FIG. 1 where it crosses flows 34 and 36, and links 20 and 22—interface 60 is not a connection to the flows or links.)

Interface 60 may provide for the activation, updating, and deactivating of consumer facing services as a local network 8 receives instructions from a user and implements such instruction by forwarding such preference information and instruction to anchor network 6.

Interface 60 may allow a local network 8 to activate and deactivate Consumer Facing Services on a retail data plan. However, interface 60 preferably does not facilitate changes to automaker/telematics/devices services as represented in FIG. 1 by Device Services Provider 13 and interface 60 preferably does not alter connectivity provided by anchor network 6.

Through interface 60, the local network 8 may provide PAM 12 with some of, or all of: a pseudo device identifier, which may be referred to as a pseudo IMSI, a pseudo MSISDN, or VIN of vehicle 16. Typically, local network 8 manages collecting VIN and assigning an associated pseudo IMSI and pseudo MSISDN.

PAM 12 may store and associate all of, or some of, a pseudo IMSI, a pseudo MSISDN, a VIN of vehicle 16, IMSI 18, or an MSISDN associated with device 14 as shown in reference to FIG. 1.

When a local network 8 has provisioned consumer services and provided provisioning information to anchor network 8 via interface 60, such consumer services (i.e., high bandwidth data flows such as flow 34 shown in bold in FIG. 1, are enabled for routing through an APN of the local network to the internet, which APN is shown as endpoint 30 in FIG. 1 and which APN/endpoint is defined by the local network. High bandwidth consumer services, once provisioned, are routed through local network PGW 9 for providing standard Internet access to a user equipment device in vehicle 16 (the user equipment device may be vehicle user equipment device 14, or a user's personal smart phone or tablet, for example). A local network 8 typically provides PAM 12 with applicable APN values on a per market basis to be provisioned in HSS 38 through a PAM-to-SIM-management provisioning and management interface 56 as shown in FIG. 1.

Continuing at step 310, PAM 12 provisions parameters that pertain to user equipment device 14 (typically parameters that relate to a SIM of the user equipment device) in HSS 38, and other components of anchor network 6, via interface 56. Other components that may be provisioned at step 310 may include subscription profile repository 40 and a preferred public land mobile network list ("P-PLMN") stored in PAM 12 and is generated by P-PLMN list generator 42. Short message service center 41 transports the P-PLMN list to mobile user equipment devices via anchor network 6. The P-PLMN list is preferably downloaded to mobile user device 14 wirelessly.

A subscriber record for a user equipment device 14 in HSS 38 typically includes a reference list of authorized visited MNOs in a PLMN list. When a user equipment device 14 is initially and originally placed into service (or if re-placed into service after maintenance activities, repair, swapping from a different vehicle than vehicle 16, or the like) and is associated with PAM 12, anchor network 6 may be configured to include information associated with local networks 8 that may be potential local networks that may cooperate with PAM 12 (but have not yet been selected by a user) to facilitate high bandwidth data traffic flows from endpoints of the local networks. This potential local network information may include information corresponding to all local networks from which a user may choose from to receive high bandwidth data flows from via the selected local networks endpoint/APN 30. Anchor network 6 may define a default machine device PLMN list for the providing of, for example, standard telematics services, as may be offered by a services provider 13. The anchor network may also define a specific and unique PLMN list for each local network 8 that may be capable of, and configured for, providing high bandwidth consumer-initiated data flows from respective APNs of the respective local networks. A vehicle user equipment device, such as device 14, may be initially associated with a default PLMN list for standard telematics services in HSS 38.

When PAM 12 receives updated provisioning information through the local network interface 60 that consumer services have been activated by a local network, the PLMN list at anchor network 6 is updated via interface 56 to reflect selection by a user/owner of vehicle 16 of one or more desired, or preferred, local networks 8. Similarly, when PAM 12 receives an update through the local network interface 60 that consumer-facing services have been deactivated, the PLMN at the HSS is updated through interface 56 to revert to, and reflect, the default standard telematics PLMN list for device 14.

Continuing with description of step 310, an HSS subscriber record typically includes a reference list of valid APNs as defined by the Anchor MNO. Normally only a first APN is defined for Automaker Facing Services, which first APN is shown in FIG. 1 as endpoint 26. When a local network enables customer-facing services for device 14, additional APNs (which may be referred to as second, third, fourth endpoints, or APNs, and so on) are added to a record corresponding to IMSI 18 of device 14 in HSS 38. Machine device 14 is typically initially provisioned to use default first APN 26 for automaker-facing services, such as telematics services provided from services provider server 13. The first APN supports automaker-facing services, or services-provider-facing services, and generally includes services in all markets as determined by the anchor network 6. After provisioning at step 310, second APN 30 in conjunction with APN steering in device 14 may determine high-volume, high-bandwidth access by market (i.e., when is a given region served with wireless access services by a particular wireless local network 8 automatically uses that particular network for high-volume, high-bandwidth consumer-facing-services). HSS 38 may contain multiple local network APN entries corresponding to respective local networks 8, which local networks provide APNs, IP addresses, or other endpoint identifiers 30 to PAM12.

HSS 38 settings may be synchronized with local network MME systems through the standard S6 interface as defined in 3GPP standard TS 23.008. HSS 38 may maintain an Operator Determined Barring General Data list as defined in 3GPP standard TS 23.003 and TS 23.008.

After provisioning of HSS 38 and related components at step 310, method 300 advances to step 311 and revises/updates provisioning information in device 14, typically by revising information stored in a SIM of the device, or the revised configuration/provisioning information may be stored in a memory portion of device 14 that is not a SIM. Information that permits use of device 14 on the one or more local networks 8 that were provisioned in HSS 38 by revising the PLMN list with P-PLMN list information at step 310 is stored to machine device 14 such that as it moves from on network to another (i.e., either moving from anchor network 6 to a local network 8, or from one local network to another local network) a processor of the machine device can access the revised P-PLMN information, determine which local network is preferable, typically according to a ranking of preferred local networks stored in the machine device (this may occur if wireless connectivity to more than one wireless network is available at a given time), and establish a wireless connection 20 to the preferred local network 8. Local networks 8 generate pseudo device identifiers, such as pseudo IMSI values, uniquely for each machine device that may be provisioned to receive services from provider server 13 and that may have such services managed by PAM 12.

At step 312, local networks 8 that may cooperate with PAM 12 to manage wireless services to device 14 provide pseudo IMSI values and related information to PAM 12.

Continuing with discussion of provisioning at step 310, part of provisioning includes receiving at the PAM a revised user device identifier from a component, or element, of a user-preferred local network component that is associated with the vehicle. Such an association between a revised device identifier and a vehicle links the vehicle, such as vehicle 16 shown in FIG. 1, with the revised, user device identifier (a device identifier is typically an IMSI) of device 14 in PAM. The revised device identifier, which may be referred to as a pseudo device identifier or pseudo-IMSI, replaces an original device identifier or IMSI, in data session transaction information records, TAP Records or CDRs or other records reflective of usage, instead of the IMSI that is encoded in the device, (typically in the SIM) when service of the device was originally activated for use on anchor network 6.

A scenario having a permanently-installed user equipment device is a preferred aspect and embodiment at the time of this application, but alternative aspects and embodiments are contemplated herein of a user equipment device being a user smart phone device, perhaps having multiple SIM capability, or eSIM capability, or where an OEM or telematics services provider has either provided the user equipment device, or has provided a SIM for use in a portable user device such as a smart phone or tablet. In such alternative scenarios, a device identifier may be initially provided, provisioned, and activated for use on an anchor wireless network and not on a local wireless network that may be preferred by a user of vehicle 16. In such a scenario where user device 14 is a smart phone or other user equipment device that is not permanently installed in vehicle 16, an original IMSI, or other original device identifier of the user equipment device, may be replaced in a data session transaction information record that corresponds to a data session where the user equipment device provides high bandwidth data connectivity with a revised/pseudo device identifier, or revised/pseudo IMSI that corresponds to a user-selected wireless network operator/provider/reseller and a wireless network associated with, or operated by, the user-selected wireless network operator/provider/reseller. For purposes of discussion herein, an entity that operates a wireless network; provides network services of a network, or components thereof, that is/are operated or provided by a different entity; or that resells services of a wireless network that is operated and/or provided by one or more other entities is referred to as a mobile network operator and may also be referred to as a partner network operator.

Continuing with discussion of FIG. 3, after anchor network 6, local networks 8, and vehicle user equipment device 14 have been provisioned at steps 310-312, vehicle 16, and thus the user equipment device, may travel, or operate, in an area having wireless network coverage provided by a local wireless network operator rather than an anchor network operator. During travel or operation in an area covered by a local wireless network, a user/driver/passenger of vehicle 16 may use user equipment device 14, shown in FIG. 1, to access high bandwidth content, such as video streaming. Also while operating in, or being located within, an area/geographic region/country, having wireless network services provided by a local wireless network rather than an anchor wireless network, user device 14 may receive an automatic software update over the air for a vehicle component, or for the user equipment device itself. Traffic is routed through endpoints 26 or 30 according to data session type (i.e., whether low or high bandwidth content, respectively) at step 313

A video stream typically arrives at the user equipment device during a data session from an endpoint associated with high bandwidth content, and such a high bandwidth source endpoint is typically identified in a data session transaction information record corresponding to the data session (e.g., a CDR, or a TAP record that has been derived from a CDR that corresponds to the high bandwidth data session) by an APN associated with high bandwidth. An OTA software update typically arrives at the user equipment device during a data session from an endpoint associated with low bandwidth content, and such a low bandwidth source endpoint is typically identified in a data session transaction information record corresponding to the data session by an APN associated with low bandwidth.

Continuing with discussion of FIG. 3, at step 314 components in local network 8, which local network provided wireless connectivity to user device 14, generate CDR records and transform them into data session transaction information records, such as TAP records, and forward the records to PAM 12 for records that include a an Anchor IMSI that is associated with the Anchor MNO 6 and PAM. At step 315, PAM 12 receives the TAP records forwarded by local network 8 at step 314.

At step 320, PAM 12 analyzes the data session information transaction records received at step 315 to determine an endpoint corresponding to the data session for each given record to determine the nature of the data session (i.e., whether high or low bandwidth content/service).

When PAM 12 determines as step 325 that a given data session information transaction record identifies a high bandwidth data session based on the record identifying a high bandwidth source endpoint, or APN, the PAM replaces the IMSI in the data session information transaction record with a pseudo IMSI associated with device 14 and corresponding to the identified APN associated with the local network and returns at step 333 the data session information transaction record to the local wireless network 8 that provided the actual wireless connectivity to the user equipment device based on an APN in the data session information transaction record.

When PAM 12 determines as step 325 that a given data session information transaction record identifies a low bandwidth data session based on the record identifying a low bandwidth source endpoint, or APN, (i.e., endpoint 26 associated with fleet manager server, telematics services provider server, or auto maker server 13) the PAM sends the data session information transaction record to the anchor wireless network 6 at step 340.

Method 300 ends at step 335.

Distinguishing, from electronic data session transaction information, traffic that passes to and from a device through an endpoint corresponding to a local network from traffic that passes through an endpoint to and from the device that has a unique device identifier that is associated with a different mobile network is necessarily a problem rooted in mobile wireless networking technology. Thus, aspects disclosed herein are wireless-mobile-network-centric because they are only of use when wireless devices roam into a mobile network that is not the anchor network, or home network, that corresponds to the unique device identifier of the device.

What is claimed is:

1. A mobile communication device, comprising:
a memory; and
a processor to:
determine one or more local wireless communication networks that are available to the mobile communication device;
determine a preferred local wireless communication network from the one or more wireless communications networks that are available;
select the preferred local wireless communication network for communicating high volume high bandwidth traffic;
communicate high volume high bandwidth traffic according to an endpoint identifier corresponding to the selected preferred local wireless communication network wherein the endpoint identifier is associated in the memory with identifying information of the selected preferred local wireless communication network; and
communicate low volume low bandwidth traffic not according to the endpoint identifier that corresponds to the selected preferred local wireless communication network,
wherein the processor determines the preferred local wireless communication network by ignoring one or more local wireless communication networks that are available based on evaluation of a forbidden preferred public land mobile network list stored in the memory.

2. The mobile communication device of claim 1 wherein the processor determines the preferred local wireless communication network from a prioritized preferred public land mobile network list stored in the memory.

3. The mobile communication device of claim 1 wherein the processor is further to communicate low volume low bandwidth traffic according to an endpoint identifier that is not the endpoint identifier associated in the memory with the selected preferred local wireless communication network.

4. The mobile communication device of claim 3 wherein the endpoint identifier that the processor uses for communication of low volume low bandwidth traffic is an endpoint identifier of an anchor mobile network operator's network and is not an endpoint of the selected preferred local wireless communication network.

5. A mobile communication device, comprising:
a memory; and
a processor to:
determine one or more local wireless communication networks that are available to the mobile communication device;
determine a preferred local wireless communication network from the one or more wireless communications networks that are available;
select the preferred local wireless communication network for communicating high volume high bandwidth traffic;
communicate high volume high bandwidth traffic according to an endpoint identifier corresponding to the selected preferred local wireless communication network wherein the endpoint identifier is associated in the memory with identifying information of the selected preferred local wireless communication network; and
communicate low volume low bandwidth traffic not according to the endpoint identifier that corresponds to the selected preferred local wireless communication network,
wherein the processor determines the preferred local wireless communication network from among the one or more local wireless communication networks that are available based on comparing Mobile Country Code ("MCC") and Mobile Network Code ("MNC") information corresponding to the one or more available wireless communication networks with MCC and MNC information associated with the one or more wireless communication networks stored in the memory.

6. The mobile communication device of claim 5 wherein the processor determines the preferred local wireless communication network from a prioritized preferred public land mobile network list stored in the memory.

7. The mobile communication device of claim 5 wherein the processor is further to communicate low volume low bandwidth traffic according to an endpoint identifier that is not the endpoint identifier associated in the memory with the selected preferred local wireless communication network.

8. The mobile communication device of claim 7 wherein the endpoint identifier that the processor uses for communication of low volume low bandwidth traffic is an endpoint identifier of an anchor mobile network operator's network and is not an endpoint of the selected preferred local wireless communication network.

9. A method, comprising:
determining one or more local wireless communication networks that are available to a mobile communication device that includes a memory and a processor;
determining a preferred local wireless communication network from the one or more wireless communications networks that are available to the mobile communication device;
selecting the preferred local wireless communication network for communicating high volume high bandwidth traffic with the mobile communication device;
communicating high volume high bandwidth traffic according to an endpoint identifier that is associated in the memory with the selected preferred local wireless communication network;
wherein the endpoint identifier used for the communicating of high volume high bandwidth traffic is not an endpoint identifier that may be used for communicating of low volume low bandwidth traffic; and
wherein the processor determines the preferred local wireless communication network from among the one or more local wireless communication networks that are available based on a Mobile Country Code ("MCC") and Mobile Network Code ("MNC") stored in the memory.

10. The method of claim 9 further comprising communicating low volume low bandwidth traffic according to an endpoint identifier that is not the endpoint identifier that is associated in the memory with the selected preferred local wireless communication network.

11. The method of claim 10 wherein the endpoint identifier for communication of low volume low bandwidth traffic is an endpoint identifier of an anchor mobile network operator's network and is not an endpoint of the selected preferred local wireless communication network.

12. A method, comprising:
determining one or more local wireless communication networks that are available to a mobile communication device that includes a memory and a processor;
determining a preferred local wireless communication network from the one or more wireless communications networks that are available to the mobile communication device;
selecting the preferred local wireless communication network for communicating high volume high bandwidth traffic with the mobile communication device;
communicating high volume high bandwidth traffic according to an endpoint identifier that is associated in the memory with the selected preferred local wireless communication network;
wherein the endpoint identifier used for the communicating of high volume high bandwidth traffic is not an endpoint identifier that may be used for communicating of low volume low bandwidth traffic; and
associating a unique identifier of the mobile communication device with a vehicle identification number of a vehicle from which, or to which, the mobile communication device communicates the high volume high bandwidth traffic.

13. A method, comprising:
determining one or more local wireless communication networks that are available to a mobile communication device that includes a memory and a processor;
determining a preferred local wireless communication network from the one or more wireless communications networks that are available to the mobile communication device;
selecting the preferred local wireless communication network for communicating high volume high bandwidth traffic with the mobile communication device;

communicating high volume high bandwidth traffic according to an endpoint identifier that is associated in the memory with the selected preferred local wireless communication network;

wherein the endpoint identifier used for the communicating of high volume high bandwidth traffic is not an endpoint identifier that may be used for communicating of low volume low bandwidth traffic;

wherein at least one data session transaction information record corresponding to at least one data flow from or to the mobile communication device via the endpoint identifier that is associated with the preferred local wireless communication network selected by the mobile communication device for communicating high volume high bandwidth traffic is to be generated;

wherein a unique identifier that corresponds to the mobile communication device with a pseudo identifier that is unique to the mobile communication device and that corresponds to the preferred local wireless communication network selected by the mobile communication device for communicating high volume high bandwidth traffic; and wherein the data session transaction information record is to be forwarded to the preferred local wireless communication network selected by the mobile communication device for communicating high volume high bandwidth traffic.

14. The method of claim 13 wherein the data session transaction information record is a Transferred Account Procedure ("TAP") record.

* * * * *